United States Patent
Gaskill et al.

(10) Patent No.: US 12,020,174 B2
(45) Date of Patent: Jun. 25, 2024

(54) SELECTING NEXT USER PROMPT TYPES IN AN INTELLIGENT ONLINE PERSONAL ASSISTANT MULTI-TURN DIALOG

(71) Applicant: eBay Inc., San Jose, CA (US)

(72) Inventors: Braddock Gaskill, South Pasadena, CA (US); Adi Guila Haviv, New York, NY (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 15/238,666

(22) Filed: Aug. 16, 2016

(65) Prior Publication Data
US 2018/0052913 A1  Feb. 22, 2018

(51) Int. Cl.
| | |
|---|---|
| *G06F 16/33* | (2019.01) |
| *G06N 5/02* | (2023.01) |
| *G06N 5/04* | (2023.01) |

(52) U.S. Cl.
CPC ........... *G06N 5/04* (2013.01); *G06F 16/3344* (2019.01); *G06N 5/02* (2013.01)

(58) Field of Classification Search
CPC ......... G06F 17/30684; G06F 17/30696; G06F 16/3344; G06F 16/338; G06F 16/243; G06N 5/02
See application file for complete search history.

(56) References Cited

U.S. PATENT DOCUMENTS

| | | | |
|---|---|---|---|
| 5,579,471 A | 11/1996 | Barber et al. | |
| 6,363,378 B1* | 3/2002 | Conklin | ............... G06F 16/3325 707/999.005 |

(Continued)

FOREIGN PATENT DOCUMENTS

| | | |
|---|---|---|
| AU | 2005202353 A1 | 6/2005 |
| CN | 1823334 A | 8/2006 |

(Continued)

OTHER PUBLICATIONS

Preliminary Amendment filed for U.S. Appl. No. 15/238,679, filed Aug. 8, 2017, 3 pages.

(Continued)

*Primary Examiner* — Brittany N Allen
(74) *Attorney, Agent, or Firm* — SCHWEGMAN LUNDBERG & WOESSNER, P.A.

(57) ABSTRACT

Systems and methods for selecting types of generated prompts for further data from a user in a multi-turn interactive dialog. In one scenario, a processed sequence of user inputs and machine-generated prompts improves searches for the most relevant items available for purchase in an electronic marketplace. The number of prompts may be limited to a predetermined maximum value. Prompt generation is minimized by incorporating into a knowledge graph world knowledge that helps user intent inference. Prompt generation may be suppressed if a search indicates the reply to a prompt will not lead to any satisfactory search results. Prompts can provide suggestions for available search results that either meet all query constraints, or meet only some query constraints if a search indicates no search results are available that meet all query constraints. Prompts can provide suggested incisive reply phrasing likely to improve search results through an affirmation or negation reply.

22 Claims, 14 Drawing Sheets

(56) References Cited

U.S. PATENT DOCUMENTS

| | | |
|---|---|---|
| 6,609,005 B1 | 8/2003 | Chern |
| 6,609,605 B1 | 8/2003 | Linder |
| 6,901,378 B1 | 5/2005 | Linker et al. |
| 7,428,516 B2 | 9/2008 | Pittman et al. |
| 7,496,514 B2 | 2/2009 | Ross et al. |
| 8,346,563 B1 | 1/2013 | Hjelm et al. |
| 8,386,495 B1 | 2/2013 | Sandler et al. |
| 8,447,823 B2 | 5/2013 | Zhang |
| 8,577,671 B1 | 11/2013 | Barve et al. |
| 8,670,979 B2 | 3/2014 | Gruber et al. |
| 8,732,030 B2 | 5/2014 | Gokturk et al. |
| 8,761,512 B1 | 6/2014 | Buddemeier et al. |
| 8,775,424 B2 | 7/2014 | Skaff et al. |
| 8,838,606 B1 | 9/2014 | Cormack et al. |
| 9,025,811 B1 | 5/2015 | Ioffe et al. |
| 9,104,100 B2 | 8/2015 | Redinger et al. |
| 9,104,700 B1 | 8/2015 | Ramkumar et al. |
| 9,153,231 B1 | 10/2015 | Salvador et al. |
| 9,189,742 B2 | 11/2015 | London |
| 9,195,898 B2 | 11/2015 | Huang et al. |
| 9,390,315 B1 | 7/2016 | Yalniz et al. |
| 9,411,830 B2 | 8/2016 | Mei et al. |
| 9,424,494 B1 | 8/2016 | Lineback et al. |
| 9,830,631 B1 | 11/2017 | Dhua et al. |
| 10,157,333 B1 | 12/2018 | Wang et al. |
| 10,417,346 B2 | 9/2019 | Kim et al. |
| 11,004,131 B2 | 5/2021 | Kale et al. |
| 2001/0049688 A1* | 12/2001 | Fratkina ............... G06F 16/954 |
| 2002/0038299 A1 | 3/2002 | Zernik et al. |
| 2003/0063779 A1 | 4/2003 | Wrigley |
| 2003/0212520 A1 | 11/2003 | Campos et al. |
| 2003/0217052 A1 | 11/2003 | Rubenczyk et al. |
| 2005/0225678 A1 | 10/2005 | Zisserman et al. |
| 2006/0074771 A1 | 4/2006 | Kim et al. |
| 2006/0253491 A1 | 11/2006 | Gokturk et al. |
| 2007/0136140 A1 | 6/2007 | Smith, Jr. |
| 2007/0156520 A1 | 7/2007 | Sharma |
| 2008/0037877 A1 | 2/2008 | Jia et al. |
| 2008/0097859 A1 | 4/2008 | Schrenk |
| 2008/0199075 A1 | 8/2008 | Gokturk et al. |
| 2008/0212899 A1 | 9/2008 | Gokturk et al. |
| 2009/0177758 A1 | 7/2009 | Banger et al. |
| 2009/0193123 A1 | 7/2009 | Mitzlaff et al. |
| 2009/0216755 A1 | 8/2009 | Itamar |
| 2009/0234712 A1 | 9/2009 | Kolawa et al. |
| 2009/0287678 A1 | 11/2009 | Brown et al. |
| 2009/0313088 A1 | 12/2009 | Ali et al. |
| 2010/0198592 A1 | 8/2010 | Potter |
| 2010/0223275 A1* | 9/2010 | Foulger ............... G06F 17/3064 |
| | | 707/767 |
| 2010/0293174 A1 | 11/2010 | Bennett et al. |
| 2011/0019925 A1 | 1/2011 | Luk |
| 2011/0029561 A1 | 2/2011 | Slaney et al. |
| 2011/0191250 A1 | 8/2011 | Bishop et al. |
| 2011/0191336 A1 | 8/2011 | Wang et al. |
| 2011/0235902 A1 | 9/2011 | Chittar et al. |
| 2011/0243459 A1 | 10/2011 | Deng |
| 2011/0246330 A1 | 10/2011 | Tikku et al. |
| 2011/0286628 A1 | 11/2011 | Goncalves et al. |
| 2012/0016678 A1* | 1/2012 | Gruber ............... G06F 17/3087 |
| | | 704/275 |
| 2012/0030227 A1 | 2/2012 | Mital et al. |
| 2012/0078825 A1 | 3/2012 | Kulkarni et al. |
| 2012/0084135 A1 | 4/2012 | Nissan et al. |
| 2012/0128239 A1 | 5/2012 | Goswami et al. |
| 2012/0154633 A1 | 6/2012 | Rodriguez |
| 2012/0177294 A1 | 7/2012 | Ke et al. |
| 2012/0209751 A1 | 8/2012 | Chen et al. |
| 2012/0215770 A1 | 8/2012 | Isaacson et al. |
| 2012/0232987 A1 | 9/2012 | Everingham |
| 2012/0283574 A1 | 11/2012 | Park et al. |
| 2012/0303615 A1 | 11/2012 | Goswami et al. |
| 2012/0308121 A1 | 12/2012 | Datta et al. |
| 2012/0323738 A1 | 12/2012 | Gokturk et al. |
| 2013/0080423 A1* | 3/2013 | Parikh ............... G06F 16/242 |
| | | 707/E17.014 |
| 2013/0080426 A1 | 3/2013 | Chen et al. |
| 2013/0085893 A1 | 4/2013 | Bhardwaj et al. |
| 2013/0127893 A1 | 5/2013 | Gokturk et al. |
| 2013/0166276 A1 | 6/2013 | Raichelgauz et al. |
| 2013/0182909 A1 | 7/2013 | Rodriguez-Serrano |
| 2014/0040274 A1 | 2/2014 | Aravamudan et al. |
| 2014/0046934 A1 | 2/2014 | Zhou et al. |
| 2014/0083963 A1 | 3/2014 | Wyner et al. |
| 2014/0136187 A1 | 5/2014 | Wolverton et al. |
| 2014/0152847 A1 | 6/2014 | Zomet et al. |
| 2014/0257792 A1 | 9/2014 | Gandrabur et al. |
| 2014/0297268 A1 | 10/2014 | Govrin et al. |
| 2014/0358906 A1 | 12/2014 | Behzadi et al. |
| 2014/0365506 A1 | 12/2014 | Gong et al. |
| 2015/0036920 A1 | 2/2015 | Wu et al. |
| 2015/0039583 A1 | 2/2015 | Liu et al. |
| 2015/0046497 A1 | 2/2015 | Campbell et al. |
| 2015/0055855 A1 | 2/2015 | Rodriguez et al. |
| 2015/0074027 A1 | 3/2015 | Huang et al. |
| 2015/0095185 A1* | 4/2015 | Katukuri ............ G06Q 30/0631 |
| | | 705/26.7 |
| 2015/0127632 A1 | 5/2015 | Khaitan et al. |
| 2015/0142704 A1 | 5/2015 | London |
| 2015/0142804 A1 | 5/2015 | Sabbouh |
| 2015/0170000 A1 | 6/2015 | Yang et al. |
| 2015/0170005 A1 | 6/2015 | Cohen et al. |
| 2015/0227557 A1 | 8/2015 | Holzschneider et al. |
| 2015/0254759 A1 | 9/2015 | Varadarajan |
| 2015/0269176 A1 | 9/2015 | Marantz et al. |
| 2015/0286898 A1 | 10/2015 | Di et al. |
| 2015/0324422 A1 | 11/2015 | Elder |
| 2015/0340033 A1 | 11/2015 | Di Fabbrizio et al. |
| 2015/0363660 A1 | 12/2015 | Vidal et al. |
| 2016/0005196 A1 | 1/2016 | Awadallah et al. |
| 2016/0026871 A1 | 1/2016 | Wexler et al. |
| 2016/0034514 A1 | 2/2016 | Singhal et al. |
| 2016/0055237 A1 | 2/2016 | Tuzel et al. |
| 2016/0078057 A1 | 3/2016 | Perez De La Coba |
| 2016/0092473 A1 | 3/2016 | Rodriguez-Serrano et al. |
| 2016/0092556 A1 | 3/2016 | Cooper et al. |
| 2016/0110071 A1 | 4/2016 | Brown et al. |
| 2016/0117360 A1* | 4/2016 | Kunc ............... G06F 16/84 |
| | | 707/730 |
| 2016/0117587 A1 | 4/2016 | Yan et al. |
| 2016/0117593 A1 | 4/2016 | London |
| 2016/0189009 A1 | 6/2016 | Tran et al. |
| 2016/0189034 A1 | 6/2016 | Shakeri et al. |
| 2016/0217157 A1 | 7/2016 | Shih et al. |
| 2016/0283580 A1 | 9/2016 | Amacker et al. |
| 2016/0342600 A1 | 11/2016 | Salaka et al. |
| 2016/0350336 A1 | 12/2016 | Checka et al. |
| 2016/0364374 A1 | 12/2016 | Jo et al. |
| 2016/0379120 A1 | 12/2016 | Merdivan et al. |
| 2017/0060867 A1 | 3/2017 | Moutinho |
| 2017/0076206 A1 | 3/2017 | Lastras-montano et al. |
| 2017/0083963 A1 | 3/2017 | Agarwal |
| 2017/0124527 A1 | 5/2017 | Traina et al. |
| 2017/0124590 A1 | 5/2017 | Griesmeyer |
| 2017/0124618 A1 | 5/2017 | Roeseler et al. |
| 2017/0124627 A1 | 5/2017 | Jihn |
| 2017/0270159 A1 | 9/2017 | Wang et al. |
| 2017/0300495 A1 | 10/2017 | Sharifi et al. |
| 2017/0300624 A1 | 10/2017 | Fink et al. |
| 2017/0344711 A1 | 11/2017 | Liu et al. |
| 2017/0364743 A1 | 12/2017 | James et al. |
| 2017/0372398 A1 | 12/2017 | Kopru et al. |
| 2018/0005293 A1* | 1/2018 | Adams ............... G06Q 30/0625 |
| 2018/0052842 A1 | 2/2018 | Hewavitharana et al. |
| 2018/0052884 A1 | 2/2018 | Kale et al. |
| 2018/0052885 A1 | 2/2018 | Gaskill et al. |
| 2018/0053069 A1 | 2/2018 | Kale et al. |
| 2018/0081880 A1 | 3/2018 | Kennedy et al. |
| 2018/0107682 A1 | 4/2018 | Wang et al. |
| 2018/0107685 A1 | 4/2018 | Kale et al. |
| 2018/0107902 A1 | 4/2018 | Yang et al. |
| 2018/0107917 A1 | 4/2018 | Hewavitharana et al. |
| 2018/0108066 A1 | 4/2018 | Kale et al. |

(56) References Cited

U.S. PATENT DOCUMENTS

| | | | |
|---|---|---|---|
| 2018/0137551 A1 | 5/2018 | Zheng et al. | |
| 2018/0239798 A1 | 8/2018 | Gupta | |
| 2018/0285682 A1 | 10/2018 | Najibi et al. | |
| 2018/0308487 A1* | 10/2018 | Goel | G10L 15/1815 |
| 2021/0166086 A1 | 6/2021 | Yang et al. | |
| 2021/0224876 A1 | 7/2021 | Kale et al. | |
| 2021/0224877 A1 | 7/2021 | Zheng et al. | |
| 2022/0050870 A1 | 2/2022 | Kale et al. | |

FOREIGN PATENT DOCUMENTS

| | | | | |
|---|---|---|---|---|
| CN | 101203856 A | 6/2008 | | |
| CN | 102667768 A | 9/2012 | | |
| CN | 104871150 A | 8/2015 | | |
| CN | 105513593 A | 4/2016 | | |
| JP | 2009-193532 A | 8/2009 | | |
| JP | 2012160693 A | 8/2012 | | |
| JP | 2013-045122 A | 3/2013 | | |
| JP | 2014-041560 A | 3/2014 | | |
| JP | WO2012160693 A1 * | 7/2014 | ....... | G06F 16/24573 |
| JP | 5752245 B2 | 7/2015 | | |
| KR | 10-2014-0050217 A | 4/2014 | | |
| KR | 10-2016-0105995 A | 9/2016 | | |
| KR | 102197023 B1 | 12/2020 | | |
| WO | 2011/088053 A2 | 7/2011 | | |
| WO | 2012/160693 A1 | 11/2012 | | |
| WO | 2014/205231 A1 | 12/2014 | | |
| WO | WO-2015172253 A1 | 11/2015 | | |
| WO | 2018/034902 A1 | 2/2018 | | |
| WO | 2018/034904 A1 | 2/2018 | | |
| WO | 2018/034928 A1 | 2/2018 | | |
| WO | 2018/034930 A1 | 2/2018 | | |
| WO | 2018/071501 A1 | 4/2018 | | |
| WO | 2018/071525 A1 | 4/2018 | | |
| WO | 2018/071764 A1 | 4/2018 | | |
| WO | 2018/071779 A1 | 4/2018 | | |
| WO | 2018/089762 A1 | 5/2018 | | |

OTHER PUBLICATIONS

International Search Report received for PCT Application No. PCT/US2017/046243, mailed on Oct. 31, 2017, 2 pages.
Written Opinion received for PCT Application No. PCT/US2017/046243, mailed on Oct. 31, 2017, 4 pages.
International Search Report received for PCT Application No. PCT/US2017/046051, mailed on Oct. 31, 2017, 3 pages.
Written Opinion received for PCT Application No. PCT/US2017/046051, mailed on Oct. 31, 2017, 4 pages.
International Search Report received for PCT Application No. PCT/US2017/046253, mailed on Oct. 20, 2017, 2 pages.
Written Opinion received for PCT Application No. PCT/US2017/046253, mailed on Oct. 20, 2017, 5 pages.
International Search Report received for PCT Application No. PCT/US2017/046023, mailed on Oct. 13, 2017, 2 pages.
Written Opinion received for PCT Application No. PCT/US2017/046023, mailed on Oct. 13, 2017, 5 pages.
International Application Serial No. PCT/US2017/046023, Article 19 Amenment filed Dec. 14, 2017, 4 pages.
U.S. Appl. No. 15/238,679, First Action Interview—Pre-Interview Communication mailed Jul. 2, 2018, 4 pages.
First Action Interview—Pre-Interview Communcation received for U.S. Appl. No. 15/238,660 mailed on Dec. 17, 2018, 21 pages.
Response to First Action Interview—Pre-Interview Communication filed on Jan. 17, 2019, for U.S. Appl. No. 15/238,660, mailed on Dec. 17, 2018, 5 pages.
Response to First Action Interview—Office Action Summary filed on Dec. 6, 2018, for U.S. Appl. No. 15/238,679, mailed on Sep. 7, 2018, 14 pages.
Non-Final Office Action received for U.S. Appl. No. 15/294,767, mailed on Jan. 24, 2019, 18 pages.
International Preliminary Report on Patentability received for PCT Application No. PCT/US2017/046023, mailed on Feb. 28, 2019, 7 pages.
International Preliminary Report on Patentability received for PCT Application No. PCT/US2017/046051, mailed on Feb. 28, 2019, 6 pages.
International Preliminary Report on Patentability received for PCT Application No. PCT/US2017/046243, mailed on Feb. 28, 2019, 6 pages.
International Preliminary Report on Patentability received for PCT Application No. PCT/US2017/046253, mailed on Feb. 28, 2019, 7 pages.
Applicant Initiated Interview Summary received for U.S. Appl. No. 15/238,679, mailed on Sep. 7, 2018, 2 pages.
First Action Interview—Office Action Summary received for U.S. Appl. No. 15/238,679, mailed on Sep. 7, 2018, 4 pages.
Response to First Action Interview—Pre-Interview Communication filed on Jul. 31, 2018 for U.S. Appl. No. 15/238,679, mailed on Jul. 2, 2018, 1 page.
Long et al., "Fully Convolutional Networks for Semantic Segmentation", Retrieved from the Internet URL:<https://people.eecs.berkeley.edu/~jonlong/long_shelhamer_fcn.pdf>, Jun. 2015, pp. 3431-3440.
International Search Report received for PCT Application No. PCT/US2017/056079, mailed on Dec. 22, 2017, 2 pages.
Written Opinion received for PCT Application No. PCT/US2017/056079, mailed on Dec. 22, 2017, 5 pages.
International Search Report received for PCT Application No. PCT/US2017/056116, mailed on Jan. 9, 2018, 2 pages.
Written Opinion received for PCT Application No. PCT/US2017/056116, mailed on Jan. 9, 2018, 5 pages.
Zheng et al., "Conditional Random Fields as Recurrent Neural Networks", Retrieved from the Internet URL:<http://www.robots.ox.ac.uk/~szheng/papers/CRFasRNN.pdf>, 2015, pp. 1-17.
First Action Interview Pre-Interview Communication received for U.S. Appl. No. 15/238,675, mailed on May 28, 2019, 5 pages.
Response to First Action Interview—Pre-Interview Communication filed on Jun. 11, 2019, for U.S. Appl. No. 15/238,675, mailed on May 28, 2019, 7 pages.
Applicant Initiated Interview Summary Received for U.S. Appl. No. 15/238,679, mailed on May 1, 2019, 3 pages.
Final Office Action received for U.S. Appl. No. 15/238,679, mailed on Apr. 1, 2019, 11 pages.
Non-Final Office Action received for U.S. Appl. No. 15/294,765, mailed on May 2, 2019, 9 pages.
Applicant Initiated Interview Summary Received for U.S. Appl. No. 15/294,767, mailed on Apr. 15, 2019, 3 pages.
International Preliminary Report on Patentability received for PCT Application No. PCT/US2017/056079, mailed on Apr. 25, 2019, 7 pages.
International Preliminary Report on Patentability received for PCT Application No. PCT/US2017/056116, mailed on Apr. 25, 2019, 7 pages.
First Action Interview—Office Action Summary received for U.S. Appl. No. 15/238,660, mailed on Jul. 17, 2019, 22 pages.
Response to First Action Interview Office action Summary Filed on Sep. 6, 2019, for U.S. Appl. No. 15/238,660, mailed on Jul. 17, 2019, 12 pages.
First Action Interview—Office Action Summary received for U.S. Appl. No. 15/238,675, mailed on Jul. 5, 2019, 5 pages.
Response to First Action Interview Office Action Summary filed on Sep. 10, 2019, for U.S. Appl. No. 15/238,675, mailed on Jul. 5, 2019, 20 pages.
Response to Final Office Action filed on Jun. 28, 2019 for U.S. Appl. No. 15/238,679, mailed on Apr. 1, 2019, 9 pages.
Applicant Initiated Interview Summary Received for U.S. Appl. No. 15/294,765, mailed on Jul. 3, 2019, 3 pages.
Response to Non-Final Office Action Filed on Sep. 3, 2019, for U.S. Appl. No. 15/294,765 mailed on May 2, 2019, 12 pages.
Applicant-Initiated Interview Summary Received for U.S. Appl. No. 15/294,767, mailed on Aug. 30, 2019, 2 pages.
Final Office Action received for U.S. Appl. No. 15/294,767, mailed on Aug. 2, 2019, 17 pages.

(56) References Cited

OTHER PUBLICATIONS

Response to Non-Final Office Action filed on Jul. 19, 2019 for U.S. Appl. No. 15/294,767, mailed on Jan. 24, 2019, 14 pages.
Extended European Search Report Received for European Patent Application No. 17841887.7, mailed on Jul. 3, 2019, 8 pages.
Jiang et al., "CSM: A Cloud Service Marketplace for Complex Service Acquisition", Acm Transactions on Intelligent Systems and Technology (Tist), Association for Computing Machinery Corporation, vol. 8, No. 1, Jul. 25, 2016, pp. 1-25.
Ma et al., "Knowledge Graph Inference for Spoken Dialog Systems", IEEE International Conference on Acoustics, Speech and Signal Processing (ICASSP), Apr. 1, 2015, 5 pages.
Final Office Action received for U.S. Appl. No. 15/238,660, mailed on Dec. 6, 2019, 11 pages.
Final Office Action received for U.S. Appl. No. 15/238,675, mailed on Dec. 2, 2019, 34 pages.
Final Office Action received for U.S. Appl. No. 15/294,765, mailed on Dec. 12, 2019, 18 pages.
Applicant Initiated Interview Summary received for U.S. Appl. No. 15/294,767, mailed on Nov. 22, 2019, 3 pages.
Non-Final Office Action received for U.S. Appl. No. 15/294,767, mailed on Oct. 25, 2019, 18 Pages.
Response to Final Office Action filed on Oct. 2, 2019 for U.S. Appl. No. 15/294,767, mailed on Aug. 2, 2019, 10 pages.
Extended European Search Report received for European Patent Application No. 17841873.7, mailed on Nov. 25, 2019, 11 pages.
Response to Extended European Search Report filed on Oct. 17, 2019 for European Patent Application No. 17841887.7, mailed on Jul. 1, 2019, 17 pages.
First Examination Report received for Australian Patent Application No. 2017312818, mailed on Oct. 23, 2019, 5 pages.
Office Action Received for Korean Patent Application No. 10-2019-7007548, mailed on Apr. 29, 2020, 5 Pages (3 pages of Official copy and 2 pages of English Translation).
Non Final Office Action Received for U.S. Appl. No. 15/238,660, mailed on Feb. 13, 2020, 12 pages.
Non Final Office Action Received for U.S. Appl. No. 15/238,675, mailed on Apr. 28, 2020, 35 pages.
Advisory Action Received for U.S. Appl. No. 15/294,765, mailed on Feb. 19, 2020, 3 pages.
Final Office Action Received for U.S. Appl. No. 15/294,767, mailed on Apr. 2, 2020, 17 pages.
Response to Non-Final Office Action filed on Feb. 28, 2020 for U.S. Appl. No. 15/294,767, mailed on Oct. 25, 2019, 10 pages.
Communication Pursuant to Article 94(3) EPC received for European Patent Application No. 17841887.7, mailed on Apr. 9, 2020, 7 pages.
Response to First Examination Report Filed on Mar. 23, 2020, for Australian Patent Application No. 2017312818, mailed on Oct. 23, 2019, 17 pages.
Second Exam Report Received for Australian Patent Application No. 2017312818, mailed on Apr. 8, 2020, 5 pages.
Office Action Received for Japanese Patent Application No. 2019-507947, mailed on Apr. 7, 2020, 19 Pages (10 pages of Official Copy and 9 pages of English Translation).
Jiang et al., "A Cloud Service Marketplace for Complex Service Acquisition", ACM Transactions on Intelligent Systems and Technology, U.S., ACM vol. 8, No. 1,, Jul. 2016, pp. 1-25.
Non Final Office Action Received for U.S. Appl. No. 15/238,675, mailed on Jan. 8, 2021, 40 pages.
Notice of Allowance received for U.S. Appl. No. 15/294,765, mailed on Jan. 1, 2021, 8 pages.
Notice of Allowance received for Korean Patent Application No. 10-2019-7007548, mailed on Sep. 23, 2020, 3 pages (2 pages of official copy & 1 page of English translation).
Final Office Action Received for U.S. Appl. No. 15/238,675, mailed on Sep. 11, 2020, 37 pages.
Advisory Action Filed for U.S. Appl. No. 15/238,679, mailed on Aug. 11, 2020, 3 pages.
Response to Non Final Office Action filed on Sep. 15, 2020 for U.S. Appl. No. 15/294,765, mailed on Jun. 15, 2020, 13 pages.
Response to Third Office Action Filed on Aug. 18, 2020, for Australian Patent Application No. 2017312818 , mailed on Jun. 22, 2020, 15 Pages.
Office Action received for Korean Patent Application No. 10-2020-7037188 mailed on Mar. 25, 2021, 6 Pages (3 pages of Official Copy and 3 pages of English Translation).
Final Office Action received for U.S. Appl. No. 15/238,675, mailed on May 5, 2021, 42 pages.
Final Office Action Received for U.S. Appl. No. 15/294,767, mailed on Mar. 11, 2021, 18 Pages.
Communication Pursuant to Article 94(3) EPC received for European Patent Application No. 17841873.7 mailed on Feb. 18, 2021, 10 pages.
Response to Office Action filed on Jun. 29, 2020 for Korean Patent Application No. 10-2019-7007548, mailed on Apr. 29, 2020, 17 pages (13 pages of official copy & 4 pages of English Translation of claims).
Response to Non-Final Office Action filed on Jul. 21, 2020 for U.S. Appl. No. 15/238,675, mailed on Apr. 28, 2020, 22 pages.
Final Office Action Received for U.S. Appl. No. 15/238,679, mailed on May 15, 2020, 11 pages.
Response to Final Office Action filed on Jul. 14, 2020 for U.S. Appl. No. 15/238,679, mailed on May 15, 2020, 11 pages.
Non Final Office Action Received for U.S. Appl. No. 15/294,765, mailed on Jun. 15, 2020, 22 pages.
Advisory Action Received for U.S. Appl. No. 15/294,767, mailed on Jun. 15, 2020, 3 pages.
Applicant Initiated Interview Summary Received for U.S. Appl. No. 15/294,767, mailed on Jul. 6, 2020, 2 pages.
Non Final Office Action Received for U.S. Appl. No. 15/294,767, mailed on Jul. 15, 2020, 18 pages.
Response to Final Office Action filed on Jun. 2, 2020, for U.S. Appl. No. 15/294,767, mailed on Apr. 2, 2020, 9 pages.
Response to Extended European Search Report Filed on Jun. 3, 2020, for European Patent Application No. 17841873.7, mailed on Nov. 25, 2019, 14 pages.
Response to Second Examination Report Filed on May 27, 2020, for Australian Patent Application No. 2017312818, mailed on Apr. 8, 2020, 17 pages.
Third Office Action Received for Australian Patent Application No. 2017312818, mailed on Jun. 22, 2020, 4 pages.
Response to Office Action filed on Jun. 8, 2020 for Japanese Patent Application No. 2019-507947, mailed on Apr. 7, 2020, 24 pages (16 pages of Official copy & 8 pages of English Translation of claims).
Notice of Allowance received for U.S. Appl. No. 15/294,767, mailed on Jun. 30, 2021, 7 pages.
Extended European search Report received for European Patent Application No. 17841888.5, mailed on Jan. 7, 2020, 8 pages.
Office Action received for Korean Patent Application No. 10-2020-7037188, mailed on Sep. 27, 2021, 4 pages (1 page of English translation & 3 pages of official copy).
Corrected Notice of Allowability received for U.S. Appl. No. 15/294,767, mailed on Nov. 10, 2021, 2 pages.
U.S. Appl. No. 15/294,773, First Action Interview—Pre-Interview Communication dated May 4, 2018, 4 pages.
Communication Pursuant to Article 94(3) EPC received for European Patent Application No. 17860463.3, dated Jan. 30, 2020, 7 pages.
EPO Decision to refuse Received for European Patent Application No. 17860463.3 mailed on Aug. 3, 2021, 13 pages.
Extended European Search Report Received for European Patent Application No. 17860463.3, dated Jun. 17, 2019, 11 pages.
Final Office Action Received for U.S. Appl. No. 15/349,462 mailed on Nov. 18, 2019, 6 pages.
Final Office Action Received for U.S. Appl. No. 15/294,756 dated Jan. 21, 2021, 35 pages.
Final Office Action received for U.S. Appl. No. 15/294,756, dated Apr. 22, 2020, 49 Pages.
Final Office Action received for U.S. Appl. No. 15/294,773 , dated May 9, 2019, 20 pages.

(56) References Cited

OTHER PUBLICATIONS

Final Office Action received for U.S. Appl. No. 15/294,773, dated Jan. 9, 2020, 26 Pages.
Final Office Action received for U.S. Appl. No. 15/238,679, mailed on Apr. 21, 2022, 11 pages.
First Action Interview—Office Action Summary received for U.S. Appl. No. 15/294,773, mailed on Oct. 30, 2018, 6 pages.
First Action Interview—Pre Interview Communication received for U.S. Appl. No. 15/238,666 , mailed on Jul. 6, 2018, 4 pages.
First Action Interview Office Action Summary received for U.S. Appl. No. 15/294,756, dated Oct. 25, 2019, 7 pages.
First Action Interview Office Action Summary received for U.S. Appl. No. 15/238,666, mailed on Sep. 7, 2018, 3 pages.
First Action Interview Pre-Interview Communication received for U.S. Appl. No. 15/294,756, dated May 23, 2019, 6 pages.
International Search Report and Written Opinion of the International Searching Authority, issued in connection with Int'l Appl. No. PCT/US2017/056508, dated Jan. 17, 2018 (10 pages).
International Search Report and Written Opinion of the International Searching Authority, issued in connection with Int'l Appl. No. PCT/US2017/056532, dated Jan. 16, 2018 (6 pages).
International Search Report and Written Opinion of the International Searching Authority, issued in connection with Int'l Appl. No. PCT/US2017/061053, dated Jan. 18, 2018 (6 pages).
Kumar et al., "Structural Similarity for Document Image Classification and Retrieval", Pattern Recognition Letters, vol. 43, Jul. 2014, pp. 119-126.
Non Final Office Action Received for U.S. Appl. No. 15/294,756, malled on Sep. 17, 2020, 27 pages.
Non-Final Office Action received for U.S. Appl. No. 15/238,679, mailed on Oct. 4, 2019, 11 pages.
Non-Final Office Action received for U.S. Appl. No. 15/294,773, dated Jul. 30, 2019, 18 pages.
Non-Final Office Action received for U.S. Appl. No. 15/349,462, mailed on Jan. 25, 2019, 31 pages.
Notice of Acceptance received for Australian Application No. 2017312818, malled on Aug. 24, 2020, 3 pages.
Notice of Allowance received for U.S. Appl. No. 15/294,773, dated Aug. 6, 2020, 10 Pages.
Notice of Allowance received for U.S. Appl. No. 15/294,773, dated Jul. 2, 2020, 10 pages.
Notice of Allowance received for U.S. Appl. No. 15/294,773, dated Mar. 18, 2020, 9 Pages.
Notice of Allowance received for U.S. Appl. No. 15/294,767, malled on Apr. 1, 2022, 8 pages.
Notice of Allowance received for U.S. Appl. No. 15/294,767, mailed on Jul. 1, 2022, 5 pages.
Notice of Allowance received for U.S. Appl. No. 15/349,462, mailed on Jun. 12, 2020.
Notice of Allowance received for U.S. Appl. No. 15/349,462, mailed on Nov. 10, 2020, 9 Pages.
Office Action received for Japanese Patent Application No. 2019-520457, mailed on Jul. 14, 2020, 7 pages (3 pages of official copy and 4 pages of English translation).
Office Action received for Korean Patent Application No. 10-2019-7013953, malled on Jul. 22, 2020, 14 pages (7 pages of official copy and 7 pages of English translation).
Result of Consultation Received for European Patent Application No. 17860463.3 malled on Jun. 18, 2021, 11 Pages.
Summons to Attend Oral Proceeding Received for European Patent Application No. 17841873.7, mailed on May 23, 2022, 9 pages.
Summons to Attend Oral Proceeding Received for European Patent Application No. 17860463.3, mailed on Apr. 7, 2021, 11 Pages.
Notice of Allowance received for U.S. Appl. No. 15/294,767, mailed on Sep. 28, 2022, 2 pages.
Corrected Notice of Allowability received for U.S. Appl. No. 15/294,767, mailed on May 19, 2022, 2 pages.
Corrected Notice of Allowability received for U.S. Appl. No. 15/294,767, mailed on Aug. 3, 2022, 2 pages.
Notice of Allowance Received for U.S. Appl. No. 15/294,767, mailed on Nov. 16, 2022, 8 pages.
Final Office Action received for U.S. Appl. No. 15/294,767, malled on Aug. 2, 2019, 17 pages.
Non-final Office Action received for U.S. Appl. No. 15/238,679, mailed on Nov. 15, 2021, 11 pages.
Notice of Allowance received for U.S. Appl. No. 17/091,851, mailed on Jul. 20, 2022, 11 Pages.
Notice of Allowance received for U.S. Appl. No. 17/091,851, mailed on May 31, 2022, 11 Pages.
EPO Written Decision to Refuse received for European Patent Application No. 17841873.7, mailed on Dec. 7, 2022, 4 Pages.
Non-Final Office Action received for U.S. Appl. No. 17/512,389, mailed on Mar. 31, 2023, 25 pages.
Notice of Allowance received for U.S. Appl. No. 15/294,767, mailed on Apr. 7, 2023, 7 pages.
Office Action received for Chinese Patent Application No. 201780050335.6, mailed on Sep. 29, 2022, 9 Pages (1 Page of English Translation & 8 pages of official Copy).
Office Action received for Chinese Patent Application No. 201780063709.8, mailed on Dec. 1, 2022, 8 Pages (1 Page of English Translation & 7 pages of official Copy).
Zheng et al., Evaluating Machine Learning Models: a Beginner's Guide to Key Concepts and Pitfalls, Oct. 21, 2015, O'Reilly Media, Inc., https://www.oreilly.com/content/evaluating-machine-learning-models/ (Year: 2015), 50 pages.
Non-Final Office Action received for U.S. Appl. No. 17/222,251 malled on Apr. 10, 2023, 13 pages.
Notice of Allowance received for U.S. Appl. No. 15/294,767, mailed on Feb. 15, 2023, 2 pages.
Notice of Allowance received for U.S. Appl. No. 15/294,767, mailed on Jan. 27, 2023, 8 pages.
U.S. Appl. No. 15/294,767, filed Oct. 16, 2016, Intelligent Online Personal Assistant With Offline Visual Search Database.

\* cited by examiner

SELECTING NEXT USER PROMPT TYPES IN AN INTELLIGENT ONLINE PERSONAL ASSISTANT MULTI-TURN DIALOG

CROSS-REFERENCE TO RELATED APPLICATIONS

This application is related by subject matter to commonly-assigned and simultaneously-filed applications sharing a common specification:
titled "Intelligent Online Personal Assistant With Natural Language Understanding", U.S. application Ser. No. 15/238,675, filed Aug. 16, 2016, and
titled "Knowledge Graph Construction For Intelligent Online Personal Assistant", U.S. application Ser. No. 15/238,679, filed Aug. 16, 2016, and
titled "Generating Next User Prompts In An Intelligent Online Personal Assistant Multi-Turn Dialog", U.S. application Ser. No. 15/238,660, filed Aug. 16, 2016, each of which is hereby incorporated by reference in its entirety.

BACKGROUND

Traditional searching is impersonal. One cannot speak to a traditional browsing engine in normal language. Conventional searching is time consuming, there is too much selection and much time can be wasted browsing pages of results. Trapped by the technical limitations of conventional tools, it is difficult for a user to communicate intent, for example a user cannot share photos of products to help with a search. As selection balloons to billions of items online, comparison searching has become more important than ever, while current solutions were not designed for this scale. Irrelevant results are often shown and do not bring out the best results. Traditional forms of comparison searching (search+refinements+browse) are no longer useful.

BRIEF SUMMARY

In one example, an intelligent personal assistant system includes scalable artificial intelligence (AI) that permeates the fabric of existing messaging platforms to provide an intelligent online personal assistant (or "bot"). The system may leverage existing inventories and curated databases to provide intelligent, personalized answers in predictive turns of communication between a human user and an intelligent online personal assistant. One example of an intelligent personal assistant system includes a knowledge graph. Machine learning components may continuously identify and learn from user intents so that user identity and understanding is enhanced over time. The user experience thus provided is inspiring, intuitive, unique and may be focused on the usage and behavioral patterns of certain age groups, such as millennials, for example.

BRIEF DESCRIPTION OF THE SEVERAL VIEWS OF THE DRAWINGS

The drawings illustrate generally, by way of example, but not by way of limitation, various embodiments discussed in the present document. In order more easily to identify the discussion of any particular element or act, the most significant digit or digits in a reference number refer to the figure number in which that element is first introduced.

DETAILED DESCRIPTION

Figure 1:
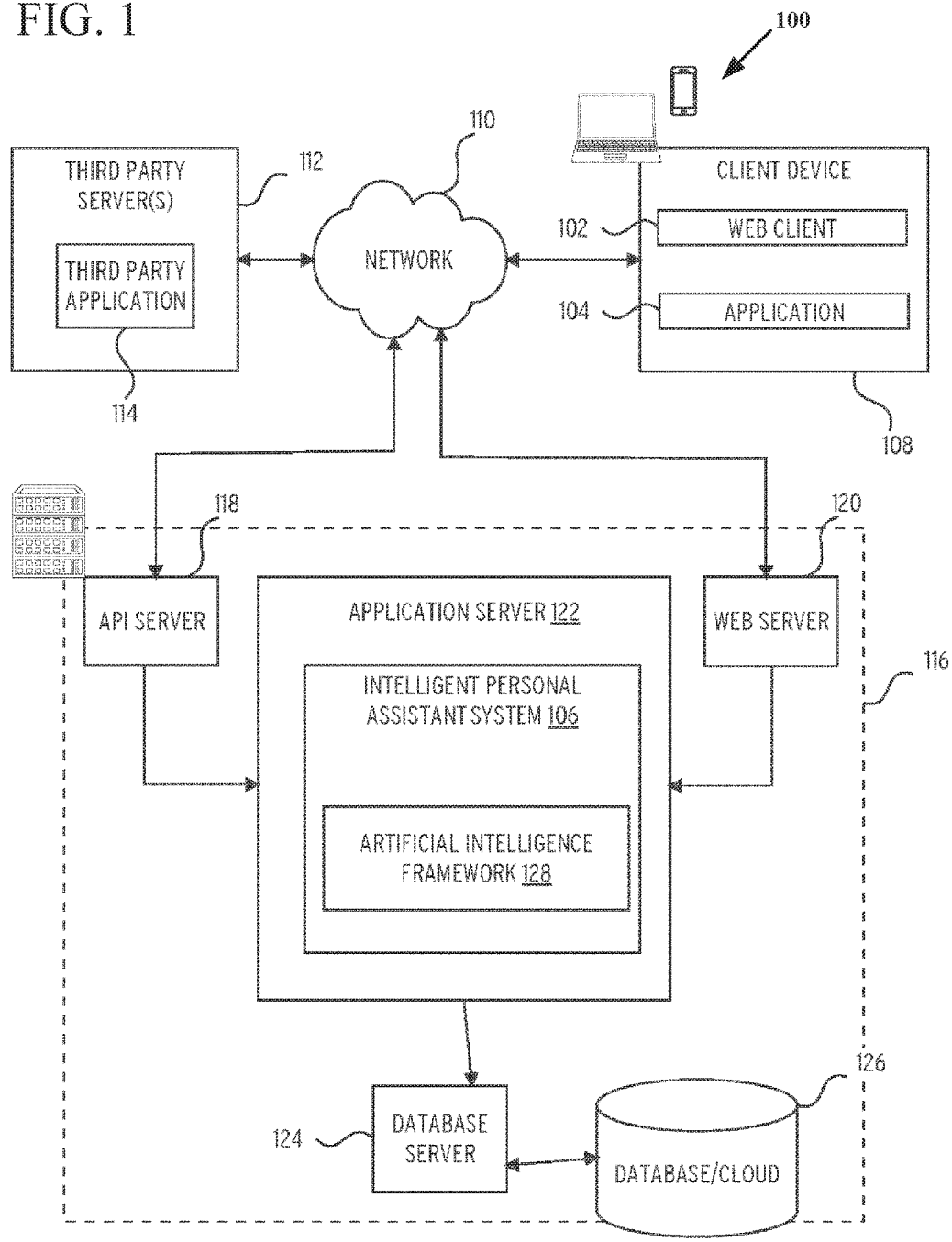
FIG. 1 shows a networked system, according to some example embodiments.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" will also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016, eBay Inc, All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

With reference to FIG. 1, an example embodiment of a high-level SaaS network architecture 100 is shown. A networked system 116 provides server-side functionality via a network 110 (e.g., the Internet or wide area network (WAN)) to a client device 108. A web client 102 and a programmatic client, in the example form of an application 104 are hosted and execute on the client device 108. The networked system 116 includes and application server 122, which in turn hosts an intelligent personal assistant system 106 that provides a number of functions and services to the application 104 that accesses the networked system 116. The application 104 also provides a number of interfaces described herein, which present output of the tracking and analysis operations to a user of the client device 108.

The client device 108 enables a user to access and interact with the networked system 116. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An Application Program Interface (API) server 118 and a web server 120 are coupled to, and provide programmatic and web interfaces respectively, to the application server 122. The application server 122 hosts an intelligent personal assistant system 106, which includes components or applications. The application server 122 is, in turn, shown to be coupled to a database server 124 that facilitates access to information storage repositories (e.g., a database/cloud 126). In an example embodiment, the database/cloud 126 includes storage devices that store information accessed and generated by the intelligent personal assistant system 106.

Additionally, a third party application 114, executing on a third party server 112, is shown as having programmatic access to the networked system 116 via the programmatic interface provided by the Application Program Interface (API) server 118. For example, the third party application 114, using information retrieved from the networked system 116, may support one or more features or functions on a website hosted by the third party.

Turning now specifically to the applications hosted by the client device 108, the web client 102 may access the various systems (e.g., intelligent personal assistant system 106) via the web interface supported by the web server 120. Similarly, the application 104 (e.g., an "app") accesses the various services and functions provided by the intelligent personal assistant system 106 via the programmatic interface provided by the Application Program Interface (API) server 118. The application 104 may, for example, an "app" executing on a client device 108, such as an iOS or Android OS application to enable user to access and input data on the networked system 116 in an off-line manner, and to perform batch-mode communications between the programmatic client application 104 and the networked system networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The intelligent personal assistant system 106 could also be implemented as a standalone software program, which does not necessarily have networking capabilities.

Figure 2:
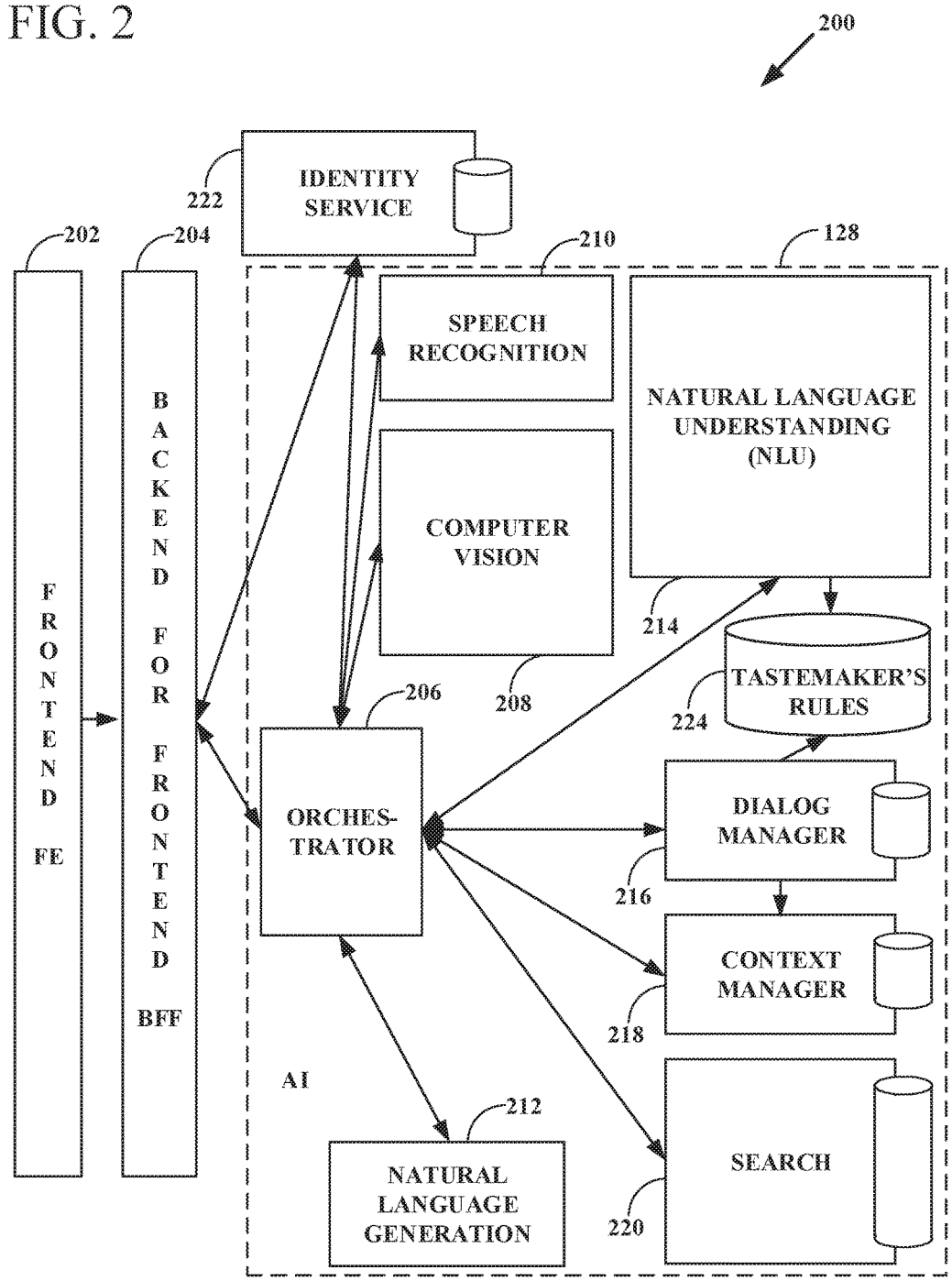
FIG. 2 shows a general architecture of an intelligent personal assistant system, according to some example embodiments.

FIG. 2 is a block diagram showing the general architecture of an intelligent personal assistant system 106, according to some example embodiments. Specifically, the intelligent personal assistant system 106 is shown to include a front end component 202 (FE) by which the intelligent personal assistant system 106 communicates (e.g., over the network 110) with other systems within the SaaS network architecture 100. The front end component 202 can communicate with the fabric of existing messaging systems. As used herein, the term messaging fabric refers to a collection of APIs and services that can power third party platforms such as Facebook messenger, Microsoft Cortana and other "bots". In one example, a messaging fabric can support an online commerce ecosystem that allows users to interact with commercial intent. Output of the front end component 202 can be rendered in a display of a client device, such as the client device 108 in FIG. 1 as part of an interface with an intelligent personal assistant, or "bot".

The front end component 202 of the intelligent personal assistant system 106 is coupled to a back end component 204 for the front end (BFF) that operates to link the front end component 202 with an artificial intelligence framework 128. The artificial intelligence framework 128 may include several components as discussed below. The data exchanged between various components and the function of each component may vary to some extent, depending on the particular implementation.

In one example of an intelligent personal assistant system 106, an AI orchestrator 206 orchestrates communication between components inside and outside the artificial intelligence framework 128. Input modalities for the AI orchestrator 206 may be derived from a computer vision component 208, a speech recognition component 210, and a text normalization component which may form part of the speech recognition component 210, for example. The computer vision component 208 may identify objects and attributes from visual input (e.g., a photo). The speech recognition component 210 may convert audio signals (e.g., spoken utterances) into text. A text normalization component may operate to make input normalization, such as language normalization by rendering emoticons into text, for example. Other normalization is possible such as orthographic normalization, foreign language normalization, conversational text normalization, and so forth.

The artificial intelligence framework 128 further includes a natural language understanding or NLU component 214 that operates to extract user intent and various intent parameters. The NLU component 214 is described in further detail beginning with FIG. 8.

The artificial intelligence framework 128 further includes a dialog manager 216 that operates to understand a "completeness of specificity" (for example of an input, such as a search query or utterance) and decide on a next action type and a related parameter (e.g., "search" or "request further information from user"). For convenience, all user inputs in this description may be referred to as "utterances", whether in text, voice, or image-related formats.

In one example, the dialog manager 216 operates in association with a context manager 218 and a Natural Language Generation (NLG) component 212. The context manager 218 manages the context and communication of a user with respect to the intelligent online personal assistant (or "bot") and the assistant's associated artificial intelligence. The context manager 218 retains a short term history of user interactions. A longer term history of user preferences may be retained in an identity service 222, described below. Data entries in one or both of these histories may include the relevant intent and all parameters and all related results of a given input, bot interaction, or turn of communication, for example. The NLG component 212 operates to compose a natural language utterance out of an AI message to present to a user interacting with the intelligent bot.

A search component 220 is also included within the artificial intelligence framework 128. The search component 220 may have front and back end units. The back end unit may operate to manage item or product inventory and provide functions of searching against the inventory, optimizing towards a specific tuple of user intent and intent parameters. The search component 220 is designed to serve several billion queries per day globally against very large high quality inventories. The search component 220 can accommodate text, or Artificial Intelligence (AI) encoded voice and image inputs, and identify relevant inventory items to users based on explicit and derived query intents.

An identity service 222 component operates to manage user profiles, for example explicit information in the form of user attributes, e.g., "name", "age". "gender", "geolocation", but also implicit information in forms such as "information distillates" such as "user interest", or "similar persona", and so forth. The artificial intelligence framework 128 may comprise part of or operate in association with, the identity service 222. The identity service 222 includes a set of policies, APIs, and services that elegantly centralizes all user information, helping the artificial intelligence framework 128 to have "intelligent" insights into user intent. The identity service 222 can protect online retailers and users from fraud or malicious use of private information.

The identity service 222 of the present disclosure provides many advantages. The identity service 222 is a single central repository containing user identity and profile data. It may continuously enrich the user profile with new insights and updates. It uses account linking and identity federation to map relationships of a user with a company, household, other accounts (e.g., core account), as well as a user's social graph of people and relationships. The identity service 222 evolves a rich notification system that communicates all and only the information the user wants at the times and media they choose.

In one example, the identity service 222 concentrates on unifying as much user information as possible in a central clearinghouse for search, AI, merchandising, and machine learning models to maximize each component's capability to deliver insights to each user. A single central repository contains user identity and profile data in a meticulously detailed schema. In an onboarding phase, the identity service 222 primes a user profile and understanding by mandatory authentication in a bot application. Any public information available from the source of authentication (e.g., social media) may be loaded. In sideboarding phases, the identity service 222 may augment the profile with information about the user that is gathered from public sources, user behaviors, interactions, and the explicit set of purposes the user tells the AI (e.g., shopping missions, inspirations, preferences). As the user interacts with the artificial intelligence framework 128, the identity service 222 gathers and infers more about the user and stores the explicit data, derived information, and updates probabilities and estimations of other statistical inferences. Over time, in profile enrichment phases, the identity service 222 also mines behavioral data such as clicks, impressions, and browse activities for derived information such as tastes, preferences, and shopping verticals. In identity federation and account linking phases, when communicated or inferred, the identity service 222 updates the user's household, employer, groups, affiliations, social graph, and other accounts, including shared accounts.

The functionalities of the artificial intelligence framework 128 can be grouped into multiple parts, for example decisioning and context parts. In one example, the decisioning part includes operations by the AI orchestrator 206, the NLU component 214, the dialog manager 216, the NLG component 212, the computer vision component 208 and speech recognition component 210. The context part of the AI functionality relates to the parameters (implicit and explicit) around a user and the communicated intent (for example, towards a given inventory, or otherwise). In order to measure and improve AI quality over time, the artificial intelligence framework 128 may be trained using sample queries (e.g., a dev set) and tested on a different set of queries (e.g., an eval set), where both sets may be developed by human curation. Also, the artificial intelligence framework 128 may be trained on transaction and interaction flows defined by experienced curation specialists, or human tastemaker override rules 224. The flows and the logic encoded within the various components of the artificial intelligence framework 128 define what follow-up utterance or presentation (e.g., question, result set) is made by the intelligent assistant based on an identified user intent.

Reference is made further above to example input modalities of the intelligent online personal assistant or bot in an intelligent personal assistant system 106. The intelligent personal assistant system 106 seeks to understand a user's intent (e.g., targeted search, compare, shop/browse, and so forth) and any mandatory parameters (e.g., product, product category, item, and so forth) and/or optional parameters (e.g., explicit information such as attributes of item/product, occasion, and so forth) as well as implicit information (e.g., geolocation, personal preferences, age, and gender, and so forth) and respond to the user with a well thought out or "intelligent" response. Explicit input modalities may include text, speech, and visual input and can be enriched with implicit knowledge of user (e.g., geolocation, previous browse history, and so forth). Output modalities can include text (such as speech, or natural language sentences, or product-relevant information, and images on the screen of a smart device, e.g., client device 108. Input modalities thus refer to the different ways users can communicate with the bot. Input modalities can also include keyboard or mouse navigation, touch-sensitive gestures, and so forth.

In relation to a modality for the computer vision component 208, a photograph can often represent what a user is looking for better than text. The user may not know what an item is called, or it may be hard or even impossible to use text for fine detailed information that only an expert may know, for example a complicated pattern in apparel or a certain style in furniture. Moreover, it is inconvenient to type complex text queries on mobile phones, and long text queries typically have poor recall. Thus, key functionalities of the computer vision component 208 may include object localization, object recognition, optical character recognition (OCR) and matching against inventory based on visual cues from an image or video. A bot enabled with computer vision is advantageous when running on a mobile device which has a built-in camera. Powerful deep neural networks can be used to enable computer vision applications.

In one example, the dialog manager 216 has as subcomponents the context manager 218 and the NLG component 212. As mentioned above, the dialog manager 216 operates to understand the "completeness of specificity" and deciding on a next action type and parameter (e.g., "search" or "request further information from user"). The context manager 218 operates to manage the context and communication of a given user towards the bot and its AI. The context manager 218 comprises two parts: a long term history and a short term memory. Each context manager entry may describe the relevant intent and all parameters and all related results. The context is towards the inventory, as well as towards other, future sources of knowledge. The NLG component 212 operates to compose a natural language utterance out of an AI message to present to a user interacting with the intelligent bot.

Fluent, natural, informative, and even entertaining dialog between man and machine is a difficult technical problem that has been studied for much of the past century, yet is still considered unsolved. However, recent developments in AI have produced useful dialog systems such as Siri™ and Alexa™.

In an ecommerce example of an intelligent bot, an initial very helpful element in seeking to solve this problem is to leverage enormous sets of e-commerce data. Some of this data may be retained in proprietary databases or in the cloud e.g., database/cloud 126. Statistics about this data may be communicated to dialog manager 216 from the search component 220 as context. The artificial intelligence framework 128 may act directly upon utterances from the user, which may be run through speech recognition component 210, then the NLU component 214, and then passed to context manager 218 as semi-parsed data. The NLG component 212 may thus help the dialog manager 216 generate human-like questions and responses in text or speech to the user. The context manager 218 maintains the coherency of multi-turn and long term discourse between the user and the artificial intelligence framework 128.

Discrimination may be recommended to poll a vast e-commerce dataset for only relevant, useful information. In one example, the artificial intelligence framework 128 uses results from the search component 220 and intelligence within the search component 220 to provide this information. This information may be combined with the history of interaction from the context manager 218. The artificial intelligence framework 128 then may decide on the next turn of dialog, e.g., whether it should be a question, or a "grounding statement" to validate, for example, an existing understanding or user intent, or an item recommendation (or, for example, any combination of all three). These decisions may be made by a combination of the dataset, the chat history of the user, and a model of the user's understanding. The NLG component 212 may generate language for a textual or spoken reply to the user based on these decisions.

Technical solutions provided by the present inventive subject matter allow users to communicate with an intelligent online personal assistant in a natural conversation. The assistant is efficient as over time it increasingly understands specific user preferences and is knowledgeable about a wide range of products. Though a variety of convenient input modalities, a user can share photos, or use voice or text, and the assisted user experience may be akin to talking to a trusted, knowledgeable human shopping assistant in a high-end store, for example.

Conventionally, the approach and data used by online shopping systems aim at a faceless demographic group of buyers with blunt, simplified assumptions to maximize short-term revenue. Conventional sites and apps do not understand how, why, and when users want to be notified. Notifications may be annoying, inappropriate, and impersonal, oblivious to each user's preferences. One person is not the same as a single account. People share accounts and devices. Passwords make platforms neither safe nor easy to use. Problems of weak online identity and the ignoring of environmental signals (such as device, location, notification after anomalous behavior) make it easy to conduct fraud in the marketplace.

Figure 3:
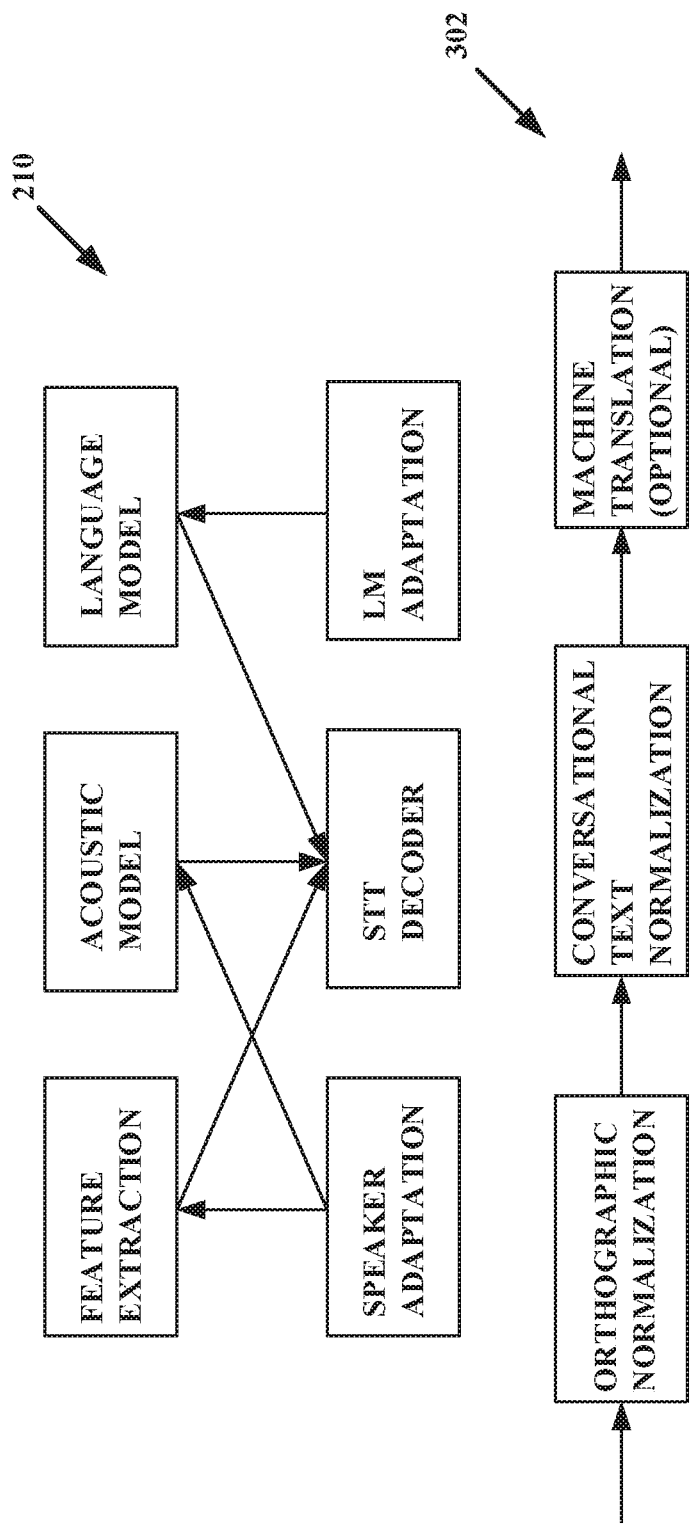
FIG. 3 shows components of a speech recognition component, according to some example embodiments.

With reference to FIG. 3, the illustrated components of the speech recognition component 210 are now described. A feature extraction component operates to convert raw audio waveform to some-dimensional vector of numbers that represents the sound. This component uses deep learning to project the raw signal into a high-dimensional semantic space. An acoustic model component operates to host a statistical model of speech units, such as phonemes and allophones. These can include Gaussian Mixture Models (GMM) although the use of Deep Neural Networks is possible. A language model component uses statistical models of grammar to define how words are put together in a sentence. Such models can include n-gram-based models or Deep Neural Networks built on top of word embeddings. A speech-to-text (STT) decoder component may convert a speech utterance into a sequence of words typically leveraging features derived from a raw signal using the feature extraction component, the acoustic model component, and the language model component in a Hidden Markov Model (HMM) framework to derive word sequences from feature sequences. In one example, a speech-to-text service in the cloud (e.g., database/cloud 126) has these components deployed in a cloud framework with an API that allows audio samples to be posted for speech utterances and to retrieve the corresponding word sequence. Control parameters are available to customize or influence the speech-to-text process.

In one example of an artificial intelligence framework 128, two additional parts for the speech recognition component 210 are provided, a speaker adaptation component and a Language Model (LM) adaptation component. The speaker adaptation component allows clients of an STT system (e.g., speech recognition component 210) to customize the feature extraction component and/or the acoustic model component for each speaker/user. This can be important because most speech-to-text systems are trained on data from a representative set of speakers from a target region and typically the accuracy of the system depends heavily on how well the target speaker matches the speakers in the training pool. The speaker adaptation component allows the speech recognition component 210 (and consequently the artificial intelligence framework 128) to be robust to speaker variations by continuously learning the idiosyncrasies of a user's intonation, pronunciation, accent, and other speech factors, and apply these to the speech-dependent components, e.g., the feature extraction component, and the acoustic model component. While this approach may require a small voice profile to be created and persisted for each speaker, the potential benefits of accuracy generally far outweigh the storage drawbacks.

The LM adaptation component operates to customize the language model component and the speech-to-text vocabulary with new words and representative sentences from a target domain, for example, inventory categories or user personas. This capability allows the artificial intelligence framework 128 to be scalable as new categories and personas are supported.

FIG. 3 also shows a flow sequence 302 for text normalization in an artificial intelligence framework 128. A text normalization component performing the flow sequence 302 is included in the speech recognition component 210 in one example. Key functionalities in the flow sequence 302 include orthographic normalization (to handle punctuation, numbers, case, and so forth), conversational text normalization (to handle informal chat-type text with acronyms, abbreviations, incomplete fragments, slang, and so forth), and machine translation (to convert a normalized sequence of foreign-language words into a sequence of words in an operating language, including but not limited to English for example).

The artificial intelligence framework 128 facilitates modern communications. Millennials for example often want to communicate via photos, voice, and text. The technical ability of the artificial intelligence framework 128 to use multiple modalities allows the communication of intent instead of just text. The artificial intelligence framework 128 provides technical solutions and is efficient. It is faster to interact with a smart personal assistant using voice commands or photos than text in many instances.

Figure 4:
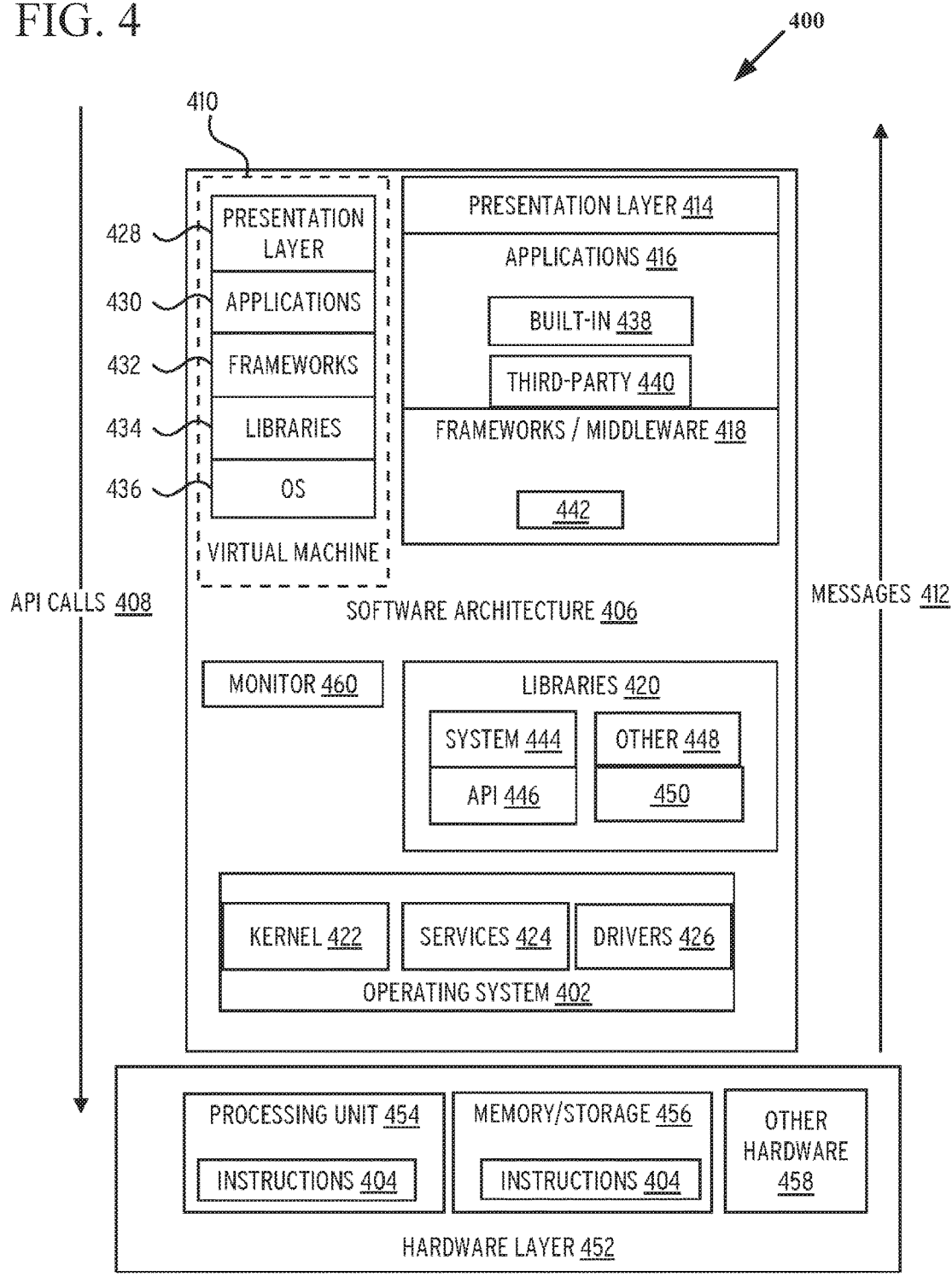
FIG. 4 shows a representative software architecture software architecture, which may be used in conjunction with various hardware architectures described herein.

FIG. 4 is a block diagram illustrating an example software architecture 406, which may be used in conjunction with various hardware architectures described herein. FIG. 4 is a non-limiting example of a software architecture and it will be appreciated that many other architectures may be implemented to facilitate the functionality described herein. The software architecture 406 may execute on hardware such as machine 500 of FIG. 5 that includes, among other things, processors 504, memory 514, and input/output (I/O) components 518. A representative hardware layer 452 is illustrated and can represent, for example, the machine 500 of FIG. 5. The representative hardware layer 452 includes a processing unit 454 having associated executable instructions 404. Executable instructions 404 represent the executable instructions of the software architecture 406, including implementation of the methods, components and so forth described herein. The hardware layer 452 also includes memory and/or storage modules memory/storage 456, which also have executable instructions 404. The hardware layer 452 may also comprise other hardware 458.

In the example architecture of FIG. 4, the software architecture 406 may be conceptualized as a stack of layers where each layer provides particular functionality. For example, the software architecture 406 may include layers such as an operating system 402, libraries 420, applications 416 and a presentation layer 414. Operationally, the applications 416 and/or other components within the layers may invoke application programming interface (API) calls 408 through the software stack and receive a response as in response to the API calls 408. The layers illustrated are representative in nature and not all software architectures have all layers. For example, some mobile or special purpose operating systems may not provide a frameworks/middleware 418, while others may provide such a layer. Other software architectures may include additional or different layers.

The operating system 402 may manage hardware resources and provide common services. The operating system 402 may include, for example, a kernel 422, services 424 and drivers 426. The kernel 422 may act as an abstraction layer between the hardware and the other software layers. For example, the kernel 422 may be responsible for memory management, processor management (e.g., scheduling), component management, networking, security settings, and so on. The services 424 may provide other common services for the other software layers. The drivers 426 are responsible for controlling or interfacing with the underlying hardware. For instance, the drivers 426 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 420 provide a common infrastructure that is used by the applications 416 and/or other components and/or layers. The libraries 420 may provide functionality that allows other software components to perform tasks in an easier fashion than to interface directly with the underlying operating system 402 functionality (e.g., kernel 422, services 424, and/or drivers 426). The libraries 420 may include system libraries 444 (e.g., C standard library) that may provide functions such as memory allocation functions, string manipulation functions, mathematical functions, and the like. In addition, the libraries 420 may include API libraries 446 such as media libraries (e.g., libraries to support presentation and manipulation of various known media formats such as MPREG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 420 may also include a wide variety of other libraries 448 to provide many other APIs to the applications 416 and other software components/modules.

The frameworks frameworks/middleware 418 (also sometimes referred to as middleware) may provide a higher-level common infrastructure that may be used by the applications 416 and/or other software components/modules. For example, the frameworks/middleware 418 may provide various graphic user interface (GUI) functions, high-level resource management, high-level location services, and so forth. The frameworks/middleware 418 may provide a broad spectrum of other APIs that may be utilized by the applications 416 and/or other software components/modules, some of which may be specific to a particular operating system or platform.

The applications 416 include built-in applications 438 and/or third-party applications 440. Examples of representative built-in applications 438 may include, but are not limited to, a contacts application, a browser application, a book reader application, a location application, a media application, a messaging application, and/or a game application. Third-party applications 440 may include any an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 440 may invoke the API calls 408 provided by the mobile operating system (such as operating system 402) to facilitate functionality described herein.

The applications 416 may use built in operating system functions (e.g., kernel 422, services 424 and/or drivers 426), libraries 420, and frameworks/middleware 418 to create user interfaces to interact with users of the system. Alternatively, or additionally, in some systems interactions with a user may occur through a presentation layer, such as presentation layer 414. In these systems, the application/component "logic" can be separated from the aspects of the application/component that interact with a user.

Some software architectures use virtual machines. In the example of FIG. 4, this is illustrated by a virtual machine 410. The virtual machine 410 creates a software environment where applications/components can execute as if they were executing on a hardware machine (such as the machine 500 of FIG. 5, for example). The virtual machine 410 is hosted by a host operating system (operating system (OS) 436 in FIG. 4) and typically, although not always, has a virtual machine monitor 460, which manages the operation of the virtual machine as well as the interface with the host operating system (e.g., operating system 402). A software architecture executes within the virtual machine 410 such as an operating system operating system (OS) 436, libraries 434, frameworks 432, applications 430 and/or presentation layer 428. These layers of software architecture executing within the virtual machine 410 can be the same as corresponding layers previously described or may be different.

Figure 5:
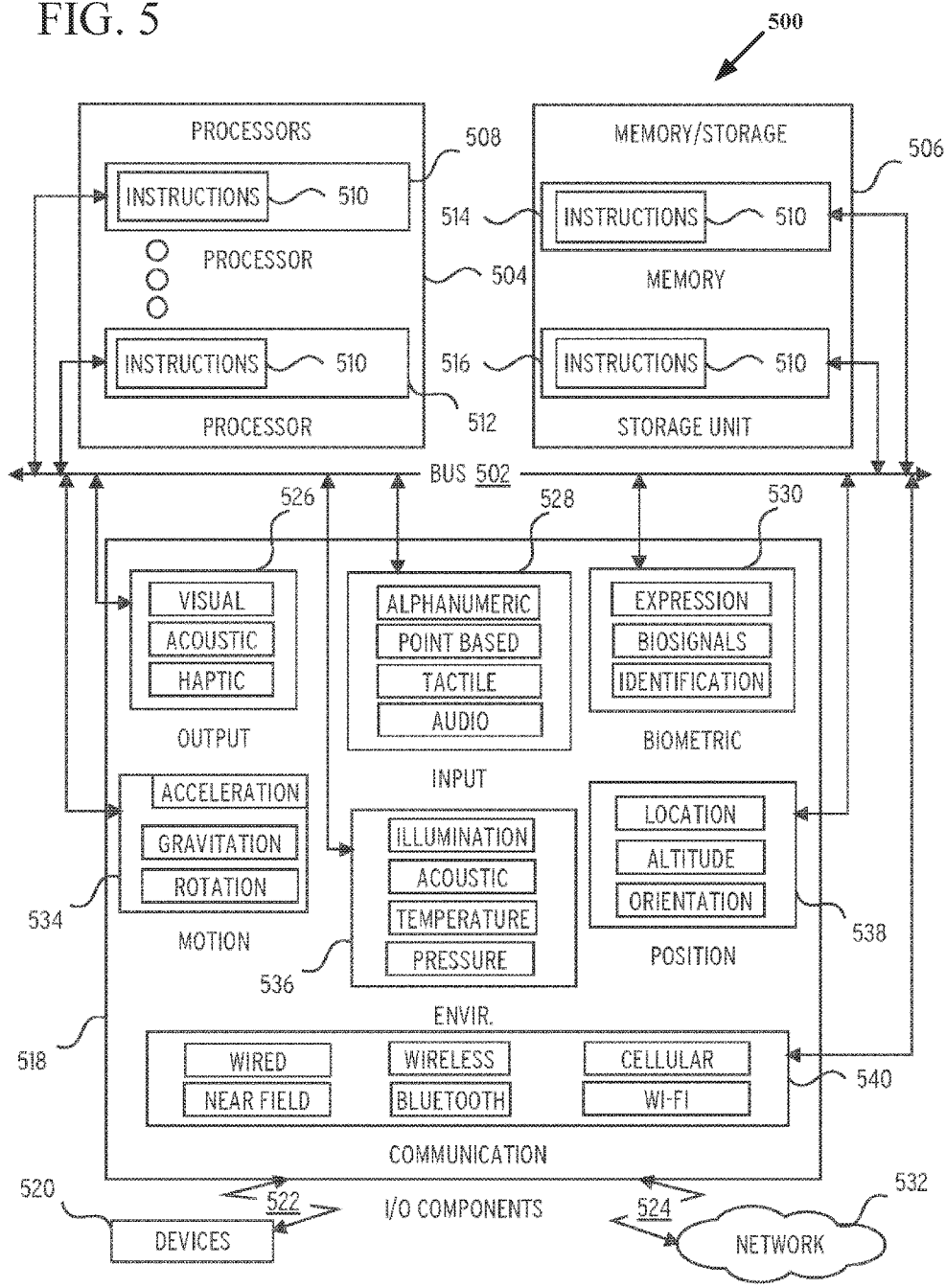
FIG. 5 shows components of a machine, according to some example embodiments, able to read instructions from a machine-readable medium (e.g., a computer-readable storage medium) and perform any one or more of the methodologies discussed herein.

FIG. 5 is a block diagram illustrating components of a machine 500, according to some example embodiments, which is able to read instructions from a machine-readable medium (e.g., a machine-readable storage medium) and perform any one or more of the methodologies discussed herein. Specifically. FIG. 5 shows a diagrammatic representation of the machine 500 in the example form of a computer system, within which instructions 510 (e.g., software, a program, an application, an applet, an app, or other executable code) for causing the machine 500 to perform any one or more of the methodologies discussed herein may be executed. As such, the instructions may be used to implement modules or components described herein. The instructions transform the general, non-programmed machine into a particular machine programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but is not limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 510, sequentially or otherwise, that specify actions to be taken by machine 500. Further, while only a single machine 500 is illustrated, the term "machine" will also be taken to include a collection of machines that individually or jointly execute the instructions 510 to perform any one or more of the methodologies discussed herein.

The machine 500 may include processors 504, memory memory/storage 506, and I/O components 518, which may be configured to communicate with each other such as via a bus 502. The memory/storage 506 may include a memory 514, such as a main memory, or other memory storage, and a storage unit 516, both accessible to the processors 504 such as via the bus 502. The storage unit 516 and memory 514 store the instructions 510 embodying any one or more of the methodologies or functions described herein. The instructions 510 may also reside, completely or partially, within the memory 514, within the storage unit 516, within at least one of the processors 504 (e.g., within the processor's cache memory), or any suitable combination thereof, during execution thereof by the machine 500. Accordingly, the memory 514, the storage unit 516, and the memory of processors 504 are examples of machine-readable media.

The I/O components 518 may include a wide variety of components to receive input, provide output, produce output, transmit information, exchange information, capture measurements, and so on. The specific I/O components 518 that are included in a particular machine will depend on the type of machine. For example, portable machines such as mobile phones will likely include a touch input device or other such input mechanisms, while a headless server machine will likely not include such a touch input device. It will be appreciated that the I/O components 518 may include many other components that are not shown in FIG. 5. The I/O components 518 are grouped according to functionality merely for simplifying the following discussion and the grouping is in no way limiting. In various example embodiments, the I/O components 518 may include output components 526 and input components 528. The output components 526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 528 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 518 may include biometric components 530, motion components 534, environmental environment components 536, or position components 538 among a wide array of other components. For example, the biometric components 530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 534 may include acceleration sensor components (e.g., accelerometer), gravitation sensor components, rotation sensor components (e.g., gyroscope), and so forth. The environment components 536 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 538 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 518 may include communication components 540 operable to couple the machine 500 to a network 532 or devices 520 via coupling 522 and coupling 524 respectively. For example, the communication components 540 may include a network interface component or other suitable device to interface with the network 532. In further examples, communication components 540 may include wired communication components, wireless communication components, cellular communication components, Near Field Communication (NFC) components. Bluetooth® components (e.g., Bluetooth® Low Energy), Wi-Fi® components, and other communication components to provide communication via other modalities. The devices 520 may be another machine or any of a wide variety of peripheral devices (e.g., a peripheral device coupled via a Universal Serial Bus (USB)).

Moreover, the communication components 540 may detect identifiers or include components operable to detect identifiers. For example, the communication components processors communication components 540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417. Ultra Code, UCC RSS-2D bar code, and other optical codes), or acoustic detection components (e.g., microphones to identify tagged audio signals). In addition, a variety of information may be derived via the communication components 540, such as, location via Internet Protocol (IP) geo-location, location via Wi-Fi® signal triangulation, location via detecting a NFC beacon signal that may indicate a particular location, and so forth.

Figure 6:
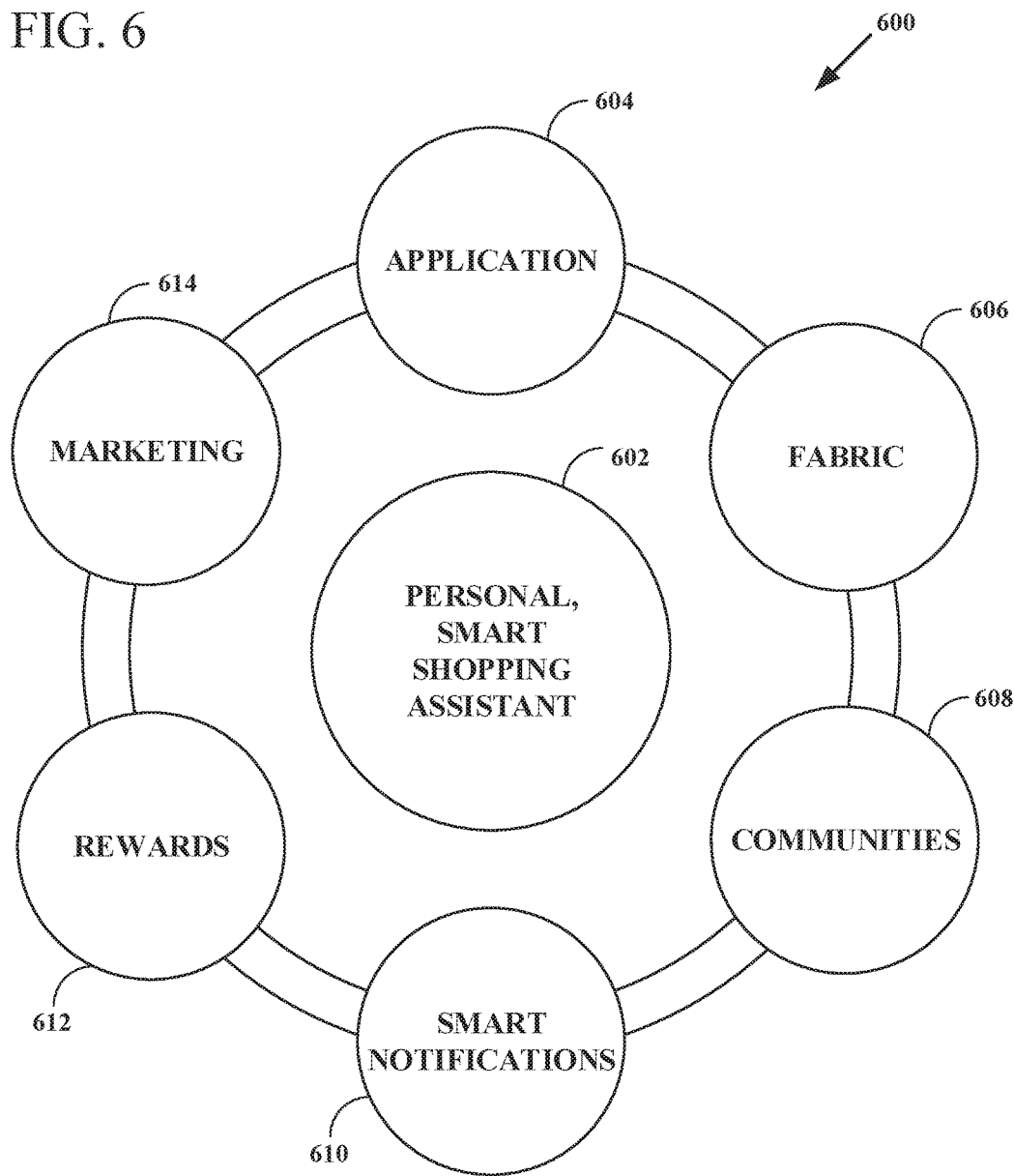
FIG. 6 shows an example environment into which an intelligent online personal assistant can be deployed, according to some example embodiments.

With reference now to FIG. 6, an example environment 600 into which an intelligent online personal assistant provided by the intelligent personal assistant system 106 can be deployed is shown. At the center of the environment 600, the intelligent bot 602 with AI appears. The bot leverages the computer vision component 208, the speech recognition component 210, the NLU component 214, the dialog manager 216, the NLG component 212, the search component 220, and identity service 222 to engage users in efficient, interesting, and effective dialog to decode their intent and deliver personalized results.

An associated application 604 can showcase the bot 602's full power and intelligence with compelling mobile design capabilities and elements. The fabric 606 integrates with Facebook Messenger™, Skype™, and Cortana™ (for example) to enable users to transact where they are already spending time. A smart notifications 610 platform delivers the right information at the right time via any number of channels (e.g., SMS, push notification, email, messaging) to users to encourage them to engage with the bot 602 and associated marketplaces. Communities 608 features enable users to connect, engage, and interact with their friends, tastemakers, and brands using the same messaging systems in which they already spend most of their time. Other features include group buying and gift buying. A rewards 612 platform incentivizes users to engage more deeply with the bot 602. Rewards can include deep discounts on products, access to unique inventory, and recognition in the app through scores, levels, etc. At marketing 614, a combination of traditional, social and other marketing is performed to win the attention of some populations (e.g., millennials) in more personal ways. Conventional techniques can include merchandising, email, search engine optimization (SEO), and search engine marketing (SEM) as well as experimental techniques such as social ads, viral coupons, and more to target new and existing users.

Figure 7:
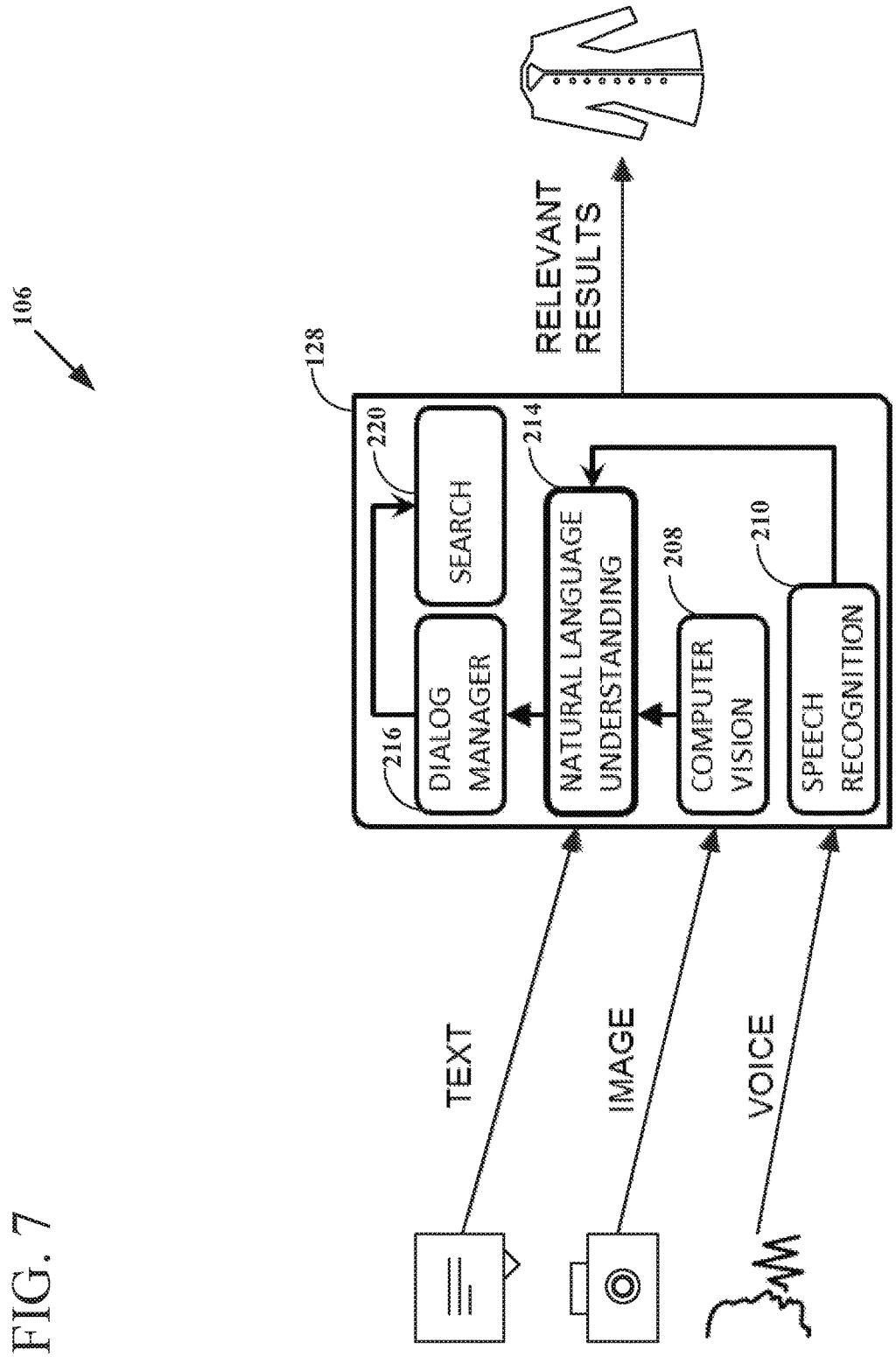
FIG. 7 shows an overview of the intelligent personal assistant system processing natural language user inputs to generate an item recommendation in an electronic marketplace, according to some example embodiments.

FIG. 7 shows an overview of the intelligent personal assistant system 106 processing natural language user inputs to generate an item recommendation in an electronic marketplace. Although the intelligent personal assistant system 106 is not limited to this use scenario, it may be of particular utility in this situation. As previously described, any combination of text, image, and voice data may be received by the artificial intelligence framework 128. Image data may be processed by the computer vision component 208 to provide image attribute data. Voice data may be processed by the speech recognition component 210 into text.

All of these inputs and others may be provided to the NLU component 214 for analysis. The NLU component 214 may operate to parse user inputs and help determine the user intent and intent-related parameters. For example, the NLU component 214 may discern the dominant object of user interest, and a variety of attributes and attribute values related to that dominant object. The NLU component 214 may also determine other parameters such as the user input type (e.g., a question or a statement) and targeted item recipients. The NLU component 214 may provide extracted data to the dialog manager 216, as well as the AI orchestrator 206 previously shown.

The NLU component 214 may generally transform formal and informal natural language user inputs into a more formal, machine-readable, structured representation of a user's query. That formalized query may be enhanced further by the dialog manager 216. In one scenario, the NLU component 214 processes a sequence of user inputs including an original query and further data provided by a user in response to machine-generated prompts from the dialog manager 216 in a multi-turn interactive dialog. This user-machine interaction may improve the efficiency and accuracy of one or more automated searches for the most relevant items available for purchase in an electronic marketplace. The searches may be performed by the search component 220.

Extracting user intent is very helpful for the AI bot in determining what further action is needed. In one ecommerce-related example, at the very highest level, user intent could be shopping, chit-chat, jokes, weather, etc. If the user intent is shopping, it could relate to the pursuit of a specific shopping mission, gifting an item for a target recipient other than the user, or just to browse an inventory of items available for purchase. Once the high level intent is identified, the artificial intelligence framework 128 is tasked with determining what the user is looking for; that is, is the need broad (e.g., shoes, dresses) or more specific (e.g., two pairs of new black Nike™ size 10 sneakers) or somewhere in between (e.g., black sneakers)?

In a novel and distinct improvement over the prior art in this field, the artificial intelligence framework 128 may map the user request to certain primary dimensions, such as categories, attributes, and attribute values, that best characterize the available items desired. This gives the bot the ability to engage with the user to further refine the search constraints if necessary. For example, if a user asks the bot for information relating to dresses, the top attributes that need specification might be color, material, and style. Further, over time, machine learning may add deeper semantics and wider "world knowledge" to the system, to better understand the user intent. For example the input "I am looking for a dress for a wedding in June in Italy" means the dress should be appropriate for particular weather conditions at a given time and place, and should be appropriate for a formal occasion. Another example might include a user asking the bot for "gifts for my nephew". The artificial intelligence framework 128 when trained will understand that gifting is a special type of intent, that the target recipient is male based on the meaning of "nephew", and that attributes such as age, occasion, and hobbies/likes of the target recipient should be clarified.

Figure 8:
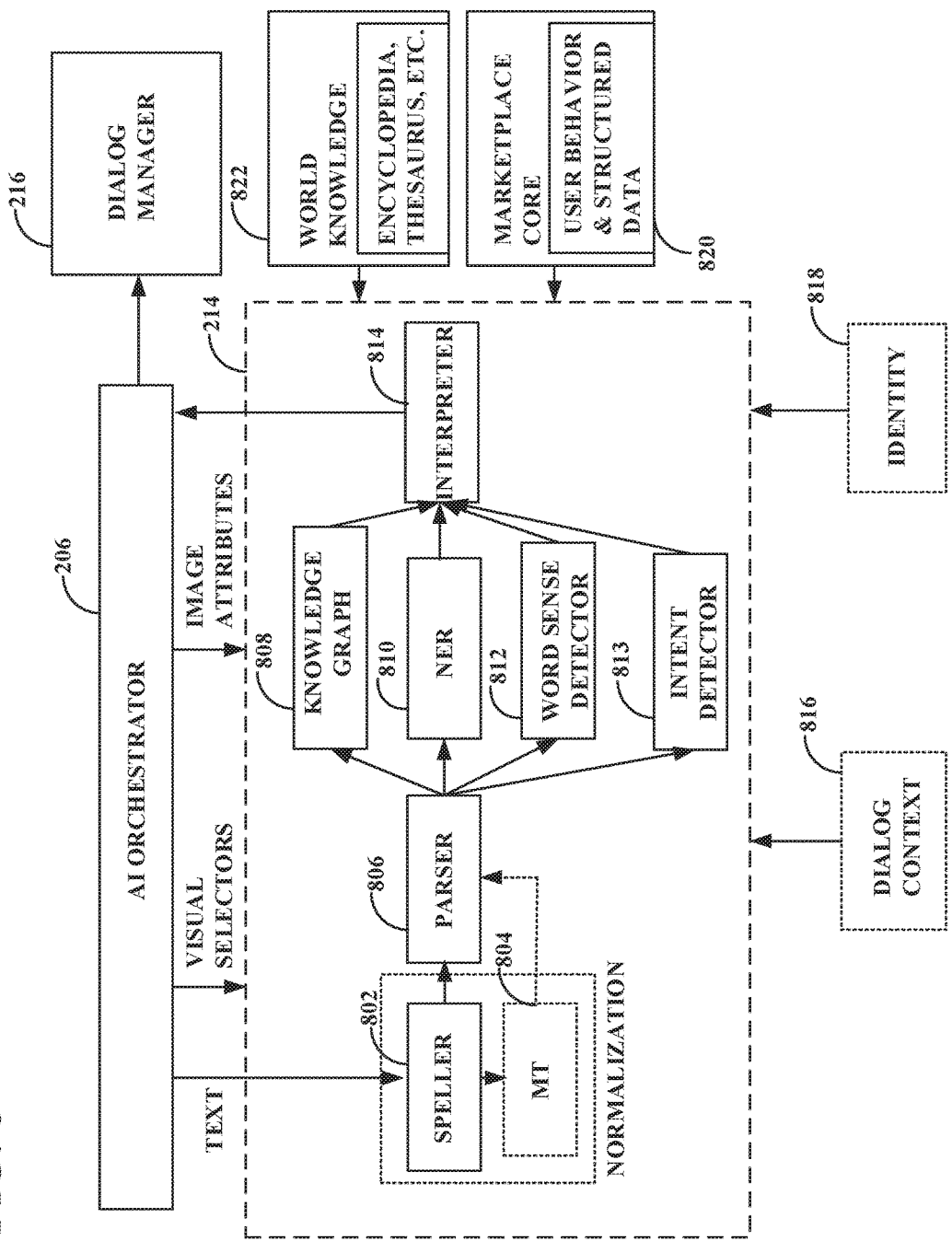
FIG. 8 shows a natural language understanding (NLU) component, its sub-components, and other components with which it interacts, according to some example embodiments.

FIG. 8 shows the NLU component 214, its sub-components, and other components with which it interacts, according to some example embodiments. In some embodiments, extracting a user intent is performed by the NLU component 214 by breaking down this often complex technical problem into multiple parts. Each of the various parts of the overall problem of extracting user intent may be processed by particular sub-components of the NLU component 214, sometimes separately and sometimes in combination.

The sub-components may for example comprise a spelling corrector (speller) 802, a machine translator (MT) 804, a parser 806, a knowledge graph 808, a Named Entity Recognition (NER) sub-component 810, a Word Sense Detector (WSD) 812, an intent detector 813, and an interpreter 814. The NLU component 214 may receive text, visual selectors, and image attributes, e.g., via the AI orchestrator 206 in one embodiment, and process each separately or in combination. A visual selector is typically a graphical choice provided by a user, such as the selection of a color from a number of presented color samples, or a selection of emoticon that has an associated and thus selected mental state. The NLU component 214 may provide its various outputs, to be described, to the AI orchestrator 206 in one embodiment, to be distributed to other components of the artificial intelligence framework 128 such as the dialog manager 216.

Other inputs considered by the NLU component 214 may include dialog context 816 (e.g., from context manager 218), user identity information 818 (e.g., from identity service 222), item inventory-related information 820 (e.g., from the core search engine 220 functions of an electronic marketplace), and external world knowledge 822 to improve the semantic inference of user intent from user input. Different types of analyses of these inputs may each yield results that may be interpreted in aggregate and coordinated via the knowledge graph 808. The knowledge graph 808 may for example be based on past users' interactions, inventory-related data, or both.

The speller 802 may identify and correct spelling mistakes in user-entered text. User text may include, but is not limited to, user queries and item titles. The machine translator 804 may optionally translate user input from the user's natural language into an operating language, including but not limited to English for example. The speller 802 and the machine translator 804 may also coordinate with other normalization sub-components and/or the parser 806 to process abbreviations, acronyms, and slang into more formal data for improved analysis.

The parser (or dependency parser) 806 may help detect the user's intent by finding a dominant object of the user's input query. This process may involve the parser identifying and analyzing noun-phrases including prepositions and direct and indirect objects, verbs, and affirmations and negations in user input such as from a multi-turn dialog. Affirmations and negations may be detected in the intent detector sub-component 813 in some embodiments, or by different sub-components such as the Word Sense Detector 812.

In one embodiment, the parser 806 finds the dominant object of user interest from the longest fragment of the user input that can be fully resolved. The parser 806 may also discard user input terms that are of low content, such as "Hi there" and "Can you help me" and so forth, and/or replace them with less machine-confusing phrases. The parser 806 may also recognize various occasions (e.g., weddings, Mother's Day, and so forth).

The intent detector 813 may further refine the identification of the user intent by identifying of the dominant objects of interest (which are usually but not always item categories) and the respective best attributes for the results suggested by the parser 806. For example, if the user intent is shopping for a specific item, the knowledge graph 808 may use dominant item categories in a given item inventory (e.g., an eBay inventory, or database/cloud 126) to which it maps. The knowledge graph 808 may also use dominant (e.g., most frequently user-queried or most frequently occurring in an item inventory) attributes pertaining to that item category, and the dominant values for those attributes. Thus, the NLU component 214 may provide as its output the dominant object, user intent, and the knowledge graph 808 that is formulated along dimensions likely to be relevant to the user query. This information may help the dialog manager 216 if there is missing information needed to fully resolve a user query to an item recommendation, and thus whether (and how) to then to prompt the user to further refine the user's requirements via additional input.

The background information for the knowledge graph 808 may be extracted from the item inventory as a blend of information derived from a hand-curated catalog as well as information extracted from historical user behavior (e.g., a history of all previous user interactions with an electronic marketplace over a period of time). The knowledge graph may also include world knowledge extracted from outside sources, such as internet encyclopedias (e.g., Wikipedia), online dictionaries, thesauruses, and lexical databases (e.g., WordNet). For example, data regarding term similarities and relationships may be available to determine that the terms girl, daughter, sister, woman, aunt, niece, grandmother, and mother all refer to female persons and different specific relative familial relationships. These additional associations may clarify the meaning or meanings of user query terms, and help prevent generation of prompts that may educate the bot but annoy the user. Focus group studies have shown that some users do not want to provide more than a predetermined number, e.g., three, of replies to prompts, so each of those prompts should be as incisive as possible.

The knowledge graph 808 may be updated dynamically in some embodiments, for example by the AI orchestrator 206. That is, if the item inventory changes or if new user behaviors or new world knowledge data have led to successful user searches, the intelligent online personal assistant 106 is able to take advantage of those changes for future user searches. An assistant that learns may foster further user interaction, particularly for those users are less inclined toward extensive conversations. Embodiments may therefore modify the knowledge graph 808 may to adjust the information it contains and shares both with other sub-components within the NLU component 214 and externally, e.g. with the dialog manager 216.

The NER sub-component 810 may extract deeper information from parsed user input (e.g., brand names, size information, colors, and other descriptors) and help transform the user natural language query into a structured query comprising such parsed data elements. The NER sub-component may also tap into world knowledge to help resolve meaning for extracted terms. For example, a query for "a bordeaux" may more successfully determine from an online dictionary and encyclopedia that the query term may refer to an item category (wine), attributes (type, color, origin location), and respective corresponding attribute values (Bordeaux, red, France). Similarly, a place name (e.g., Lake Tahoe) may correspond to a given geographic location, weather data, cultural information, relative costs, and popular activities that may help a user find a relevant item. The structured query depth (e.g., number of tags resolved for a given user utterance length) may help the dialog manager 216 select what further action it should take to improve a ranking in a search performed by the search component 220.

The Word Sense Detector 812 may process words that are polysemous, that is, have multiple meanings that differ based on the context. For example, the input term "bank" could refer to an "edge of a river" in a geographic sense or a "financial institution" in a purchase transaction payment sense. The Word Sense Detector 812 detects such words and may trigger the dialog manager 216 to seek further resolution from a user if a word sense remains ambiguous. The Word Sense Detector 812 or the intent detector sub-component 813 may also discern affirmations and negations from exemplary phrases including but not limited to "Show me more" or "No, I don't like that", respectively, and so forth. The functions of the parser 804, the intent detector 813, and the Word Sense Detector 812 may therefore overlap or interact to some extent, depending on the particular implementation.

The interpreter 814 reconciles the analyzed information coming from the various NLU sub-components and prepares output. The output may for example comprise a dominant object of a user query, as well as information resolved regarding relevant knowledge graph dimensions (e.g., item categories, item attributes, item attribute values), the user's intent (e.g., in the case of shopping, whether shopping for a specific item, looking for a gift, or general browsing), a type of user statement recognized, the intended target item recipient, and so forth. Through the combination of separate analyses performed on shared, augmented, and processed user inputs, the components of the artificial intelligence framework 128 provide a trusted personal shopper (bot) that both understands user intent and is knowledgeable about a wide range of products. The NLU component 214 thus transforms a natural language user query into a structured query to help provide the most relevant results to a user.

The NLU component 214 therefore improves the operation of the intelligent personal assistant system 106 overall by reducing mistakes, increasing the likelihood of correct divination of user intent underlying a user query, and yielding faster and better targeted searches and item recommendations. The NLU component 214, particularly together with the dialog manager 216 in multi-turn dialog scenarios, effectively governs the operation of the search component 220 by providing more user interaction history-focused and/or item inventory-focused search queries to execute. This distinctive functionality goes beyond the current state of the art via a particular ordered combination of elements as described.

Examples of use of the NLU component 214 and the intelligent personal assistant system 106 more generally for processing input data from a user are now described. A user may provide a spoken statement like "I am looking for a pair of sunglasses for my wife." The NLU component 214 may process this natural language user input to generate a more formal query to be provided to a search engine 220 and/or dialog manager 216. The more formal query may comprise a group of tags that associate each of one or more resolved handles with a corresponding resolved value. For example, the more formal query may comprise "<intent:gifting, statement-type:statement, dominant-object:sunglasses, target: wife, target-gender:female>". A search engine may provide more relevant results based on a search of these tags than would result from a search of the originally submitted user input.

In this example, the intelligent personal assistant system 106 determines that the user intent is gifting (versus merely self-shopping or browsing), that the user has provided a statement (versus a question) and that the dominant object of the user's interest is sunglasses. Although the user is shopping, the intent is to gift the item to a particular target item recipient, his wife. A gifting mission is known to be a special type of a shopping mission that may be handled somewhat differently than general inventory browsing or shopping for an item by the user for the user.

The intelligent personal assistant system 106 may also discern, typically by the Named Entity Recognizer sub-component 810, that "wife" refers to a female person. The particular individual who is the targeted item recipient may be found from data provided by the identity service 212, for example. Further, through use of world knowledge, the intelligent personal assistant system 106 may determine that the term "wife" refers to a married female person, and that children are generally not married. This information may be helpful in constraining a search to women's sunglasses versus other types of sunglasses (e.g., men's sunglasses, children's sunglasses) to generate a more relevant item recommendation without requiring a user prompt to acquire the same information.

Figure 9:
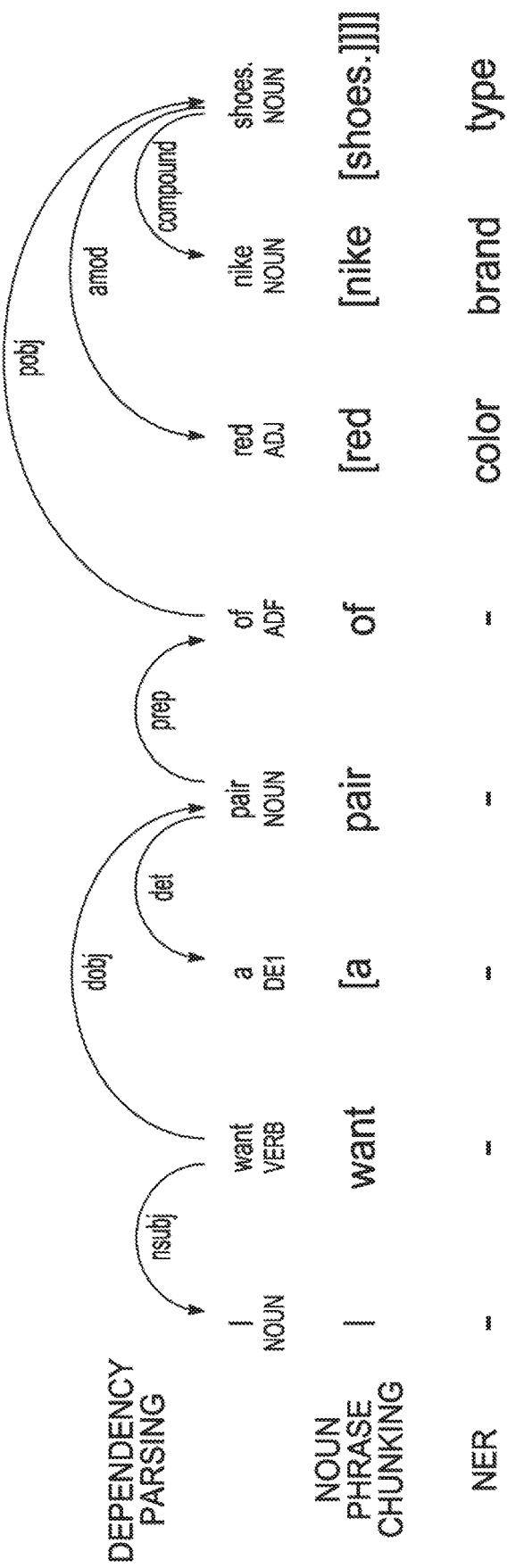
FIG. 9 shows the results of various analyses, according to some example embodiments.

FIG. 9 shows the results of various analyses, according to some example embodiments. In one example, a user may type the text input "Hi, can you find me a pair of red nikey shoes?" The resulting formal query may comprise "<intent: shopping, statement-type:question, dominant-object: shoes, target:self, color:red, brand:nike>". Here the user input is a question and the user is shopping for a particular item (versus merely browsing an item inventory or looking for a gift for someone else). The parser 806 may determine that the terms "Hi, can you find me" do not provide a great deal of helpful content and may thus be disregarded.

The speller sub-component 802 may determine that "nikey" is a known misspelling of the term "nike", and make appropriate correction. The parser sub-component 806 may grammatically analyze the normalized input data by identifying verbs, prepositions, and noun phrases. The grammatical relationships between individual words may illustrate how one word depends on or modifies another, and this information may provide clues for transforming a user query.

The parser sub-component 806 may also perform noun phrase chunking and discern from the longest parsed query fragment "red nike shoes" that the dominant object of the user's interest is shoes. That is, shoes are determined to be the object of the largest number of modifiers and are at the deepest level of a resulting chunking structure. Note that although the dominant object is often an item category, that is not necessarily always the case. The dominant object here is also described by modifiers ("red" and "nike") which the Named Entity Recognizer 810 may determine relate to a color and a brand, respectively.

Note also that in this instance two attributes (color, brand) and corresponding attribute values (red, nike) are provided for the dominant object, while in the previous example at best one attribute was provided (e.g., women's sunglasses were indirectly specified via inference). The dialog manager 216 may decide as a result that the user's original query is sufficiently constrained that an appropriate prompt may be one or more item recommendations, rather than a question asking a user for additional constraints that would further narrow the subsequent search. In contrast, for the previous query much more detail regarding women's sunglasses may be needed, so the dialog manager 216 may generate a number of prompts in a multi-turn dialog to that end. Some users are annoyed by a large number of prompts however, and would prefer to deal with a bot that is able to extract more information on its own from every turn. It is therefore advantageous to minimize the number of turns in a multi-turn dialog by gleaning as much information from each user utterance as possible.

For example, the NLU component 214 may determine that there are many different listings for red nike shoes in a searched item inventory and/or that the interactions of previous users determined additional attribute values before users made item selections. Therefore, the NLU component 214 may consult the knowledge graph 808 to determine the most helpful attributes for this dominant object of user interest. The knowledge graph 808 may have information indicating that for the item category "shoes", the most helpful and/or frequently specified attributes are color, brand, and size, along with corresponding conditional probability values showing the relative correlation or association strength or conditional probability of importance of each in finding a relevant item. It may be the case that all of those attributes probably need to be parameterized for a query to be deemed sufficiently specific to result in search success. It may also be the case however that only a limited number of the attributes that adequately cover a predetermined percentage of the available associations need to be parameterized.

The user has provided attribute values for color and brand in this example, but not for size, so the dialog manager 216 may therefore ask the user "What size do you want?" and await further user input. Suppose the user replies "I want 10." What does this mean? The intelligent personal assistant system 106 could interpret "I want 10" as meaning the user wants ten of the previously specified red nike shoes. World knowledge might provide the information that shoes generally come in pairs, so a reinterpretation of the user's response to the prompt could be somewhat refined to the notion that the user instead wants ten pairs of red nike shoes. Neither interpretation is correct however, because neither considers the context of the conversation. That is, the "I want 10" user input is a reply to a prompt that was generated to gather more information (a value for the size attribute in this case) regarding a previous utterance. If the intelligent personal online assistant 106 cannot associate the reply with any previous user inputs, it may output an error statement indicating that it cannot resolve the conversational context.

The context manager 218 may prevent such confusion by tracking not only the long-term history of user interactions but also the short-term memory of a current user's interactions for a given shopping mission. A reply to a prompt in a multi-turn dialog is not necessarily an isolated user utterance, but is usually contextually related to previous user utterances and previous prompts (if any) in a dialog. The intelligent personal assistant system 106 is therefore adapted toward user conversations that lead to accumulated search constraints sufficient to make a refined search query more successful at finding a relevant item to recommend.

In some cases however, the NLU component 214 may determine that the user has abandoned a previous query mission and is now interested in finding something else. The dialog manager 216 may therefore receive an indication of that determination from the NLU component 214 in some embodiments, and alter its behavior accordingly. That dialog manager 216 behavior may comprise saving the interactions for the current search mission for possible later use for example, and starting a new dialog based on the current user utterance without using any of the context information relating to the previous search mission. In one embodiment, the NLU component 214 may determine that such a change of mission has occurred when a new dominant object of user interest is detected.

Figure 10:
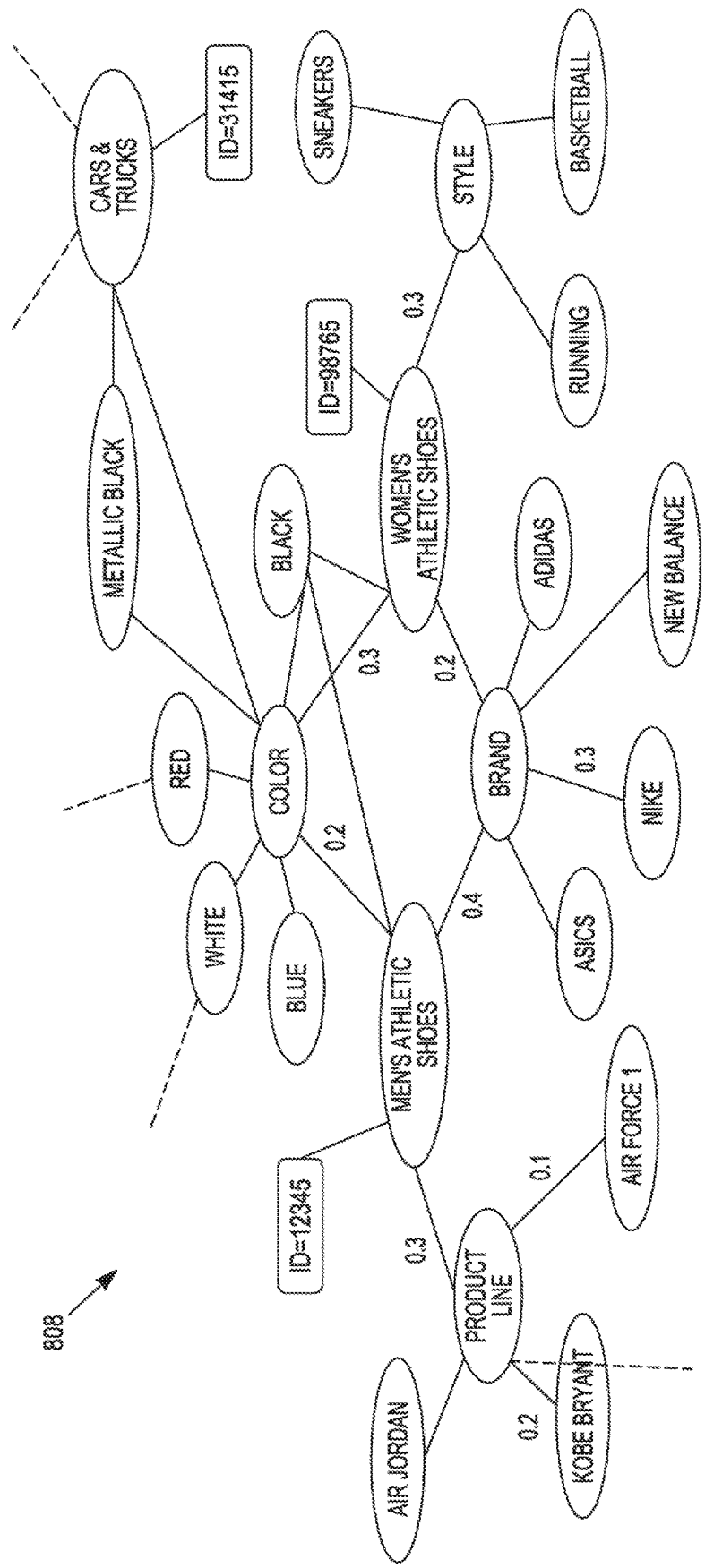
FIG. 10 shows a knowledge graph, according to some example embodiments.

FIG. 10 shows a knowledge graph 808, according to some example embodiments. The knowledge graph 808 is generally a database or file that represents a plurality of nodes, shown here in ellipses. Each node may represent an item category, an item attribute, or an item attribute value for the exemplary scenario of processing natural language user inputs to generate an item recommendation. In this example, item categories include "Men's Athletic Shoes", "Cars & Trucks", and "Women's Athletic Shoes". Each item category may have been assigned an identification number, as shown, by an inventory tracking system or by the intelligent personal assistant system 106 for example.

The item attributes shown in the knowledge graph 808 in this example include "Product Line", "Brand", "Color", and "Style". Item attributes are often directly linked to item categories, although that is not always the case. The item attribute values in the knowledge graph 808 in this example include "Air Jordan". "Kobe Bryant". "Air Force 1", "Asics", "Nike", "New Balance", "Adidas", "Blue", "White", "Red", "Black", "Metallic Black", "Running", "Basketball", and "Sneakers". The item attribute values are often directly linked to item attributes, although again that is not always the case.

The links shown between the knowledge graph 808 nodes are directed edges that may have an associated correlation or association value indicating a strength of a relationship between two particular nodes. Some of the correlation values of the knowledge graph 808 are indicated in FIG. 10. The correlation values may be created in a variety of ways, and may be used for a variety of purposes.

For example, in one embodiment, the correlation values may be derived from an inventory of items available for purchase. The inventory may be current or historical. When a seller lists an item for sale, the seller may specify one or more item categories, attributes, and/or attribute values as metadata that describe the item and are thus useful search terms that may be provided by a user who is looking to buy the item. In some cases, an electronic marketplace may categorize a seller's item in various ways, such as by providing guides to a seller that describe available predetermined item categories and commonly used descriptive terms.

For example, a seller may have a pair of shoes to sell and may specify that they are men's blue athletic running shoes made by Adidas. The seller may specify to the marketplace that the item category is "men's athletic shoes", and the seller may be prompted to specify item attributes, for example from a list of item attributes. Alternately, an electronic marketplace may identify that the seller has provided a number of item attribute values, and may automatically relate these item attribute values to various item attributes, e.g., those attributes that have those values as specified possibilities, perhaps in metadata. The electronic marketplace may for example determine that "men's athletic shoes" is actually a sub-category or attribute of the broader category of "shoes" because either a seller or the electronic marketplace for example has defined sub-categories or attributes for that category.

An electronic marketplace may periodically analyze its inventory of items available for sale and provide summary data describing that inventory in the form of the knowledge graph 808. In this approach, the exemplary knowledge graph 808 may note that of all inventory items in the category "men's athletic shoes", thirty percent (or 0.3) of the items are characterized by the item attribute "Product Line", forty percent (or 0.4) of the items are characterized by the item attribute "Brand", and twenty percent (0.2) of the items are characterized by the item attribute "Color", as shown. Of the items characterized by the item attribute "Product Line", twenty percent (or 0.2) have the item attribute value of "Kobe Bryant" and ten percent (or 0.1) have the item attribute value of "Air Force 1", as shown. Thus, in this embodiment, the knowledge graph 808 may comprise entries that describe the actual inventory of items available.

For a very large electronic marketplace with perhaps millions of items available for purchase, detailed analysis of the entire item inventory, particularly its status at any given moment in time, may be computationally expensive. Such analyses may therefore be performed only on an occasional or periodic ongoing basis. Statistical sampling methods may also produce a knowledge graph 808 that describes an approximate estimate of the characteristics of the item inventory.

During the processing of a user query, the parsed input data elements from the user query may be matched against the dimensions of the knowledge graph 808 to help match the user's demands with the available supply of items. The dimensions of the knowledge graph 808 may comprise the item categories, item attributes, and item attribute values that describe the items available for purchase. If a user has expressed an interest in men's athletic shoes, the user expects the intelligent personal assistant system 106 to help the user find a relevant item from the inventory of items available for purchase. Finding an item that is not available for purchase may cause a user to lose interest in shopping entirely, an outcome of great concern. The correlational values may therefore represent the relative number of items in a given item category, described by a given item attribute, or having a given item attribute value. The correlational values may be based on conditional probabilities, e.g. given that a particular item attribute is specified, what is the probability that a particular item attribute value is specified.

In a different embodiment, the knowledge graph 808 may be based on the historical interaction of all users with an electronic marketplace over a period of time. That is, the nodes may comprise search terms provided by many previous users in their utterances or navigational histories with the marketplace. Rather than analyzing the inventory as previously described, this approach analyzes the user behavior, e.g. what buyers are saying and doing when they are interacting with the marketplace to find a relevant item in the inventory.

In this example embodiment, the correlation values shown in FIG. 10 may indicate the most prevalent or frequently occurring user interactions in terms of conditional probabilities. If a user indicates an interest in women's athletic shoes for example, the knowledge graph 808 may indicate that in thirty percent (or 0.3) of such buyer interactions, the buyer specifies an item attribute of "Style", in twenty percent (or 0.2) of such buyer interactions, the buyer specifies an item attribute of "Brand", and in thirty percent (0.3) of such buyer interactions, the buyer specifies an item attribute of "Color". Thus, regardless of the available inventory, the knowledge guide 808 characterizes the search behavior of users, e.g., how users are attempting to find relevant items.

As in the previous embodiment, during the processing of a user query, the parsed input data elements from the user query may be matched against the dimensions of the knowledge graph 808 to help match the user's demands with the available supply of items. However, the dimensions of the knowledge graph 808 may now comprise the categories, attributes, and attribute values provided by previous users' query inputs when they were looking for relevant items to purchase. If a user has expressed an interest in women's athletic shoes for example, the intelligent personal assistant system 106 may best proceed by determining how other users went about finding an item relevant to women's athletic shoes item from the inventory of items available for purchase. The correlation values or scores in the knowledge graph 808 may therefore represent the relative number of times a given category, a given attribute, or a given attribute value were used in leading to a satisfactory search conclusion. The correlation values in other words may effectively represent a measure of how "beaten" is a given portion of a user interaction path traversing from one search term to another in the knowledge graph 808.

Regardless of how the knowledge graph 808 is formulated, the match between user input terms and knowledge graph dimensions (e.g., item categories, item attributes, and item attribute values) may be used to transform the original user query into an improved query. The match may for example help determine what, if any, prompts should be generated for the user in a multi-turn dialog to best find a relevant search result. Thus, the NLU component 214 may provide information from the knowledge graph 808 to the dialog manager 216 for this purpose. That is, the NLU component 214 may deliver a concise knowledge graph 808, with dimensions having some relevance, to the dialog manager 216, along with the dominant object of user interest, user intent, and related parameters.

Figure 11A:
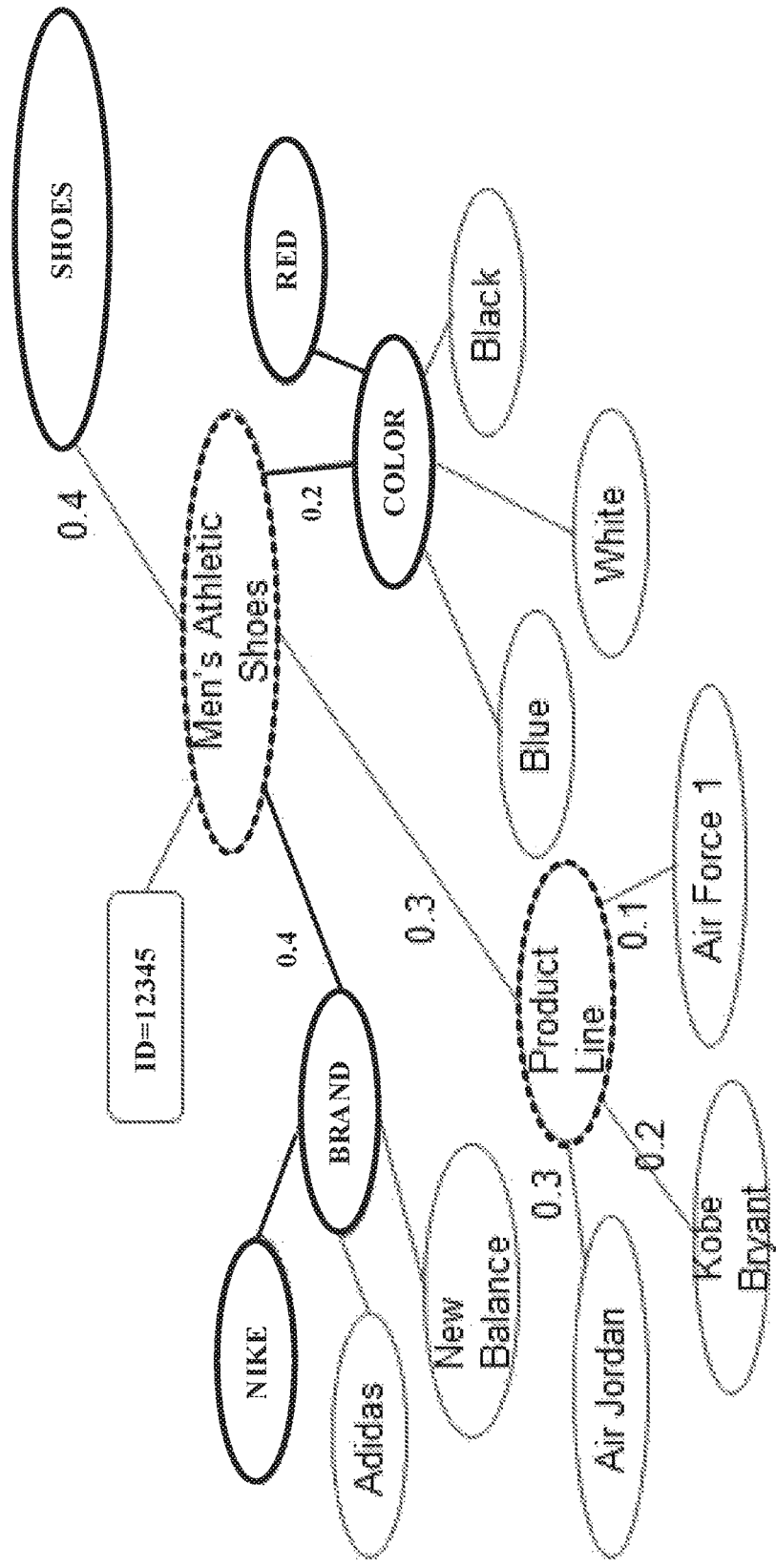
FIGS. 11A and 11B show a concise knowledge graph with an item category, some item attributes, and some item attribute values, according to some example embodiments.
Figure 11B:
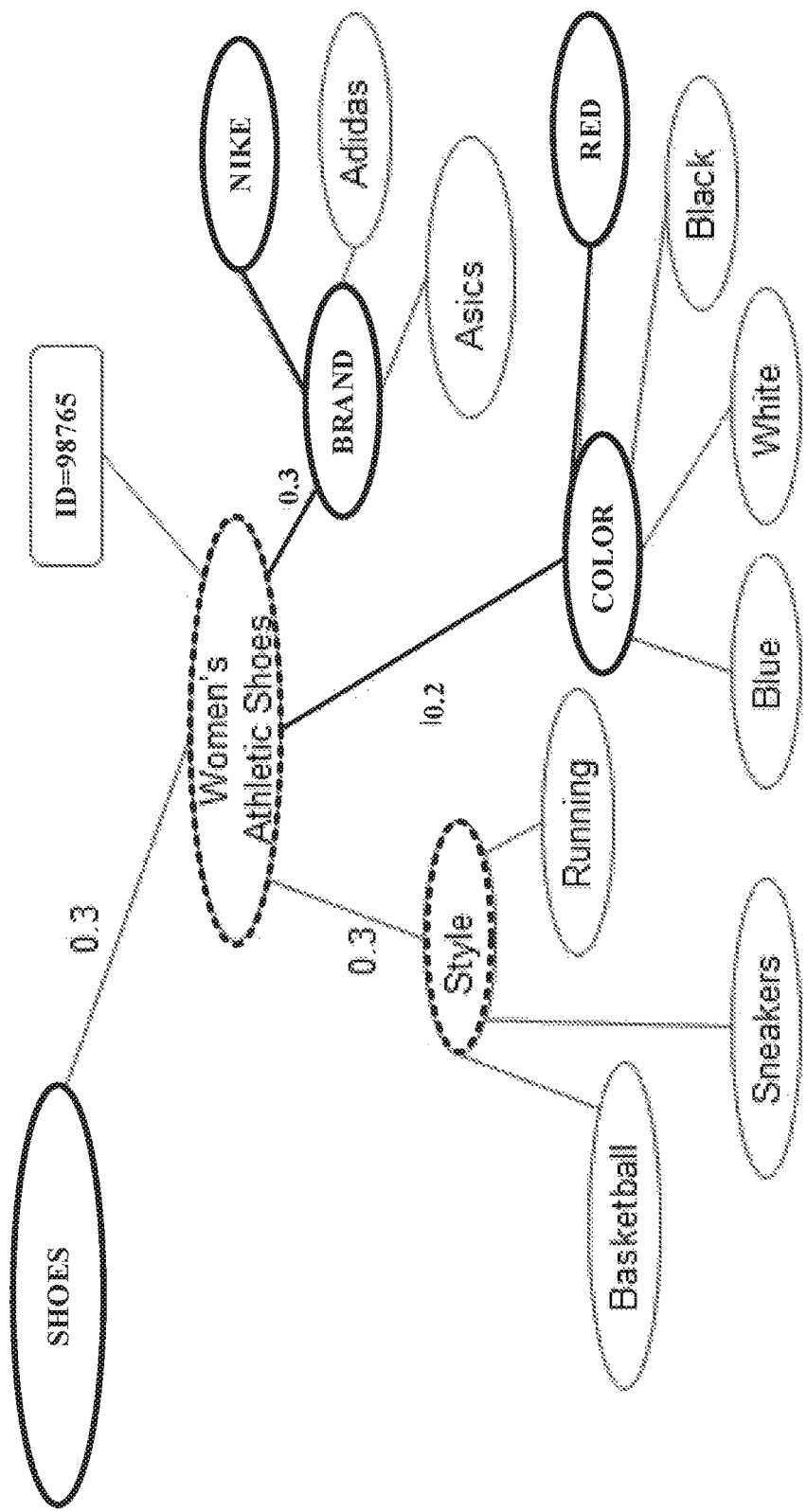

FIGS. 11A and 11B show a concise knowledge graph 808 with an item category, some item attributes, and some item attribute values, according to some example embodiments. Each figure is shown and discussed separately for clarity, but together may refer actually to a knowledge graph 808 common to the two figures. In FIG. 11A, the normalized and parsed user query has provided the item attribute/value tags of <color:red, brand:nike> for a dominant object of user interest "Shoes", as previously described. The knowledge graph 808 indicates there is a forty percent (0.4) correlation between "Shoes" and "Men's Athletic Shoes", and that there is a forty percent (0.4) correlation between "Men's Athletic Shoes" and "Brand", and a twenty percent (0.2) correlation between "Men's Athletic Shoes" and "Color". There is also a thirty percent (0.3) correlation between "Men's Athletic Shoes" and "Product Line", and various correlations for various item attribute values (e.g., "Air Jordan", "Kobe Bryant", and "Air Force 1") are known. Thus, whether based on inventory or user behavior, the as-yet unspecified query terms of "Men's Athletic Shoes" and "Product Line" have significant associations with a successful search. The dialog manager 216 may therefore rank and prioritize the parameterization of these as-yet unspecified possibilities through user prompts according to their association or correlation values, or their relative positions in the knowledge graph 808 hierarchy, or a combination of both.

Similarly, for FIG. 11B, the knowledge graph 808 indicates there is a thirty percent (0.3) correlation between "Shoes" and "Women's Athletic Shoes", and that there is a thirty percent (0.4) correlation between "Women's Athletic Shoes" and "Style". Neither "Women's Athletic Shoes" nor "Style" have been specified by the user, nor have relevant item attribute values for "Style" (e.g., "Basketball", "Running", and "Sneakers") been specified. The dialog manager 216 may therefore also prioritize the parameterization of these as-yet unspecified possibilities through user prompts according to their association or correlation values, or their relative positions in the knowledge graph 808 hierarchy, or a combination of both.

In one prompt generation strategy, the dialog manager 216 may proceed from the broadest category to a sub-category or attribute and then to an attribute value to determine a sequence of prompt topics, in that order. That is, given that the category of "Shoes" has been specified, the dialog manager 216 may proceed directly to resolve whether the user is interested in "Men's Athletic Shoes" or "Women's Athletic Shoes" as those two possibilities have the highest (or only) available association strengths in the knowledge graph 808. This hierarchically guided search approach may appeal to users who do not want to answer more than a limited number of prompts to zero in on a relevant item.

In another prompt generation strategy, the dialog manager 216 may choose prompt topics more randomly from all unspecified attributes and attribute values that appear in the knowledge graph 808. Although this approach is somewhat undirected, it may be appropriate when a user is browsing an inventory, versus pursuing a specific shopping mission. Users who are not annoyed by chatting with an intelligent personal assistant system 106 may prefer this more exploratory or conversational approach that in a sense wanders through the possibilities of the knowledge graph 808.

In FIGS. 11A and 11B, candidate prompts for further user input may be selected by whether the user is more interested in men's or women's athletic shoes, and also, accordingly, whether the user is interested in a particular product line or style. Note that the narrower attributes in the knowledge graph 808 (product line or style, in this case) may actually be better candidates for a user prompt in some situations, depending on how dispositive each candidate is. That is, style and product line are each equally associated with the respective item attribute or sub-category above each of them in the knowledge graph 808, but there is more data available for the product line attribute value possibilities. Thus, a prompt that asks if a user is interested in Air Jordan shoes implicitly also asks if the user is interested in a particular product line and in men's athletic shoes. A single affirmation or negation by the user could therefore help discern the user's intent in terms accepting or rejecting multiple possibilities (e.g. attribute and attribute value) at one time.

Figure 12:
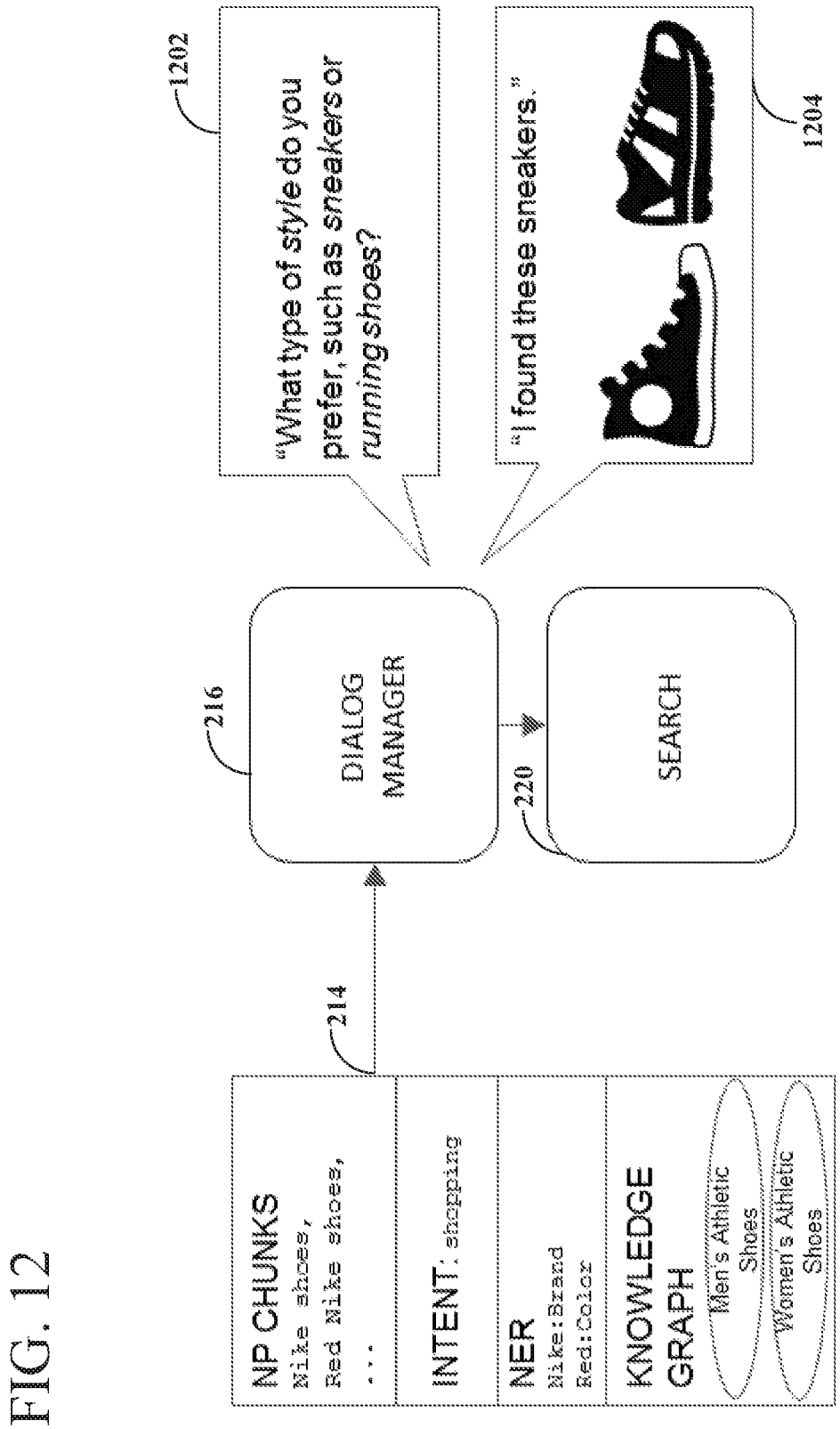
FIG. 12 shows an overview of the intelligent personal assistant system processing natural language user inputs to generate suggestive prompts, according to some example embodiments.

FIG. 12 shows an overview of the intelligent personal assistant system 106 processing natural language user inputs to generate suggestive prompts, according to some example embodiments. Since prompts to users that are not incisive (e.g., providing information that could be determined without asking the user) are known to annoy some users, some embodiments may use additional data to narrow the field of possible search constraints to be expressly given by a user. For example, the NLU component 214 has discerned the user is interested in shopping for red nike shoes, and the knowledge graph 808 indicates that men's athletic shoes and women's athletic shoes are possible prompt subjects (among others).

However, additional data may be available that indicates whether the user is interested in men's athletic shoes or women's athletic shoes without asking. For example, the current user's interaction history with the electronic marketplace may indicate that most or all of the user's purchases have been for items associated with women. That may be because the current user is a woman performing another self-shopping mission, or perhaps because the current user often performs gifting missions where the intended target recipient is a woman, for example. Further, world knowledge or other potentially relevant external contextual information may adjust the weighting of prompt possibilities by dialog manager 216. External data regarding locations, weather, costs, culture, and occasions for example may play similar roles in adjusting the determination of a next prompt for maximum incisiveness.

The intelligent personal assistant system 106 may therefore conclude that the user is probably more interested in women's athletic shoes than men's athletic shoes without generating a prompt to confirm that point. The dialog manager 216 may thus proceed to the next most likely-incisive prompt topic based on the processed user inputs and the knowledge graph 808. In the example of FIG. 11B, given that the user is interested in women's athletic shoes and has already specified values for the attributes of brand and color, the best candidate prompt may relate to the as-yet unspecified attribute, style.

The dialog manager 216 may therefore simply ask the user "What type of style do you prefer?" However, this approach does not take advantage of the additional knowledge available regarding item attribute values in the knowledge graph 808, whether from item inventory data or past user interaction data. Therefore, in one embodiment, the dialog manager may generate a prompt for additional user input that also states alternatives that are available in the knowledge graph 808 and/or may have association values available in the knowledge graph 808.

For example, prompt 1202 may instead ask the user "What type of style do you prefer, such as sneakers or running shoes?" This type of question prompt formulation both informs the user of suggestions that may be relevant (e.g. due to inventory or past user interaction behaviors) to a successful search and gathers additional user input. Note that not all of the known item attribute values in the knowledge graph need be suggested, and not all edges directed between entries may have a specified score value. As before, the intelligent personal assistant system 106 may use other data to winnow the possibilities to those that are more discerning.

Further, the dialog manager 216 may even provide suggested precise user input phrasing that is likely to lead to a relevant search result when used in a reply. For example, prompt 1202 may instead ask the user "Would you like 'sneaker style' or 'running shoe style'?". Such phrasing suggestions may lead to reply (particularly a spoken reply) that has all of the remaining as-yet-unspecified constraints in an easily processed form (e.g., "sneaker style" specifies both an attribute value of sneaker and an attribute of style).

In another example, the dialog manager 216 may have enough data from the analysis of the user inputs and from other data to generate a prompt that makes suggestive item recommendations. In this case, the dialog manager may have data indicating that the user may be interested in sneakers. Rather than using a question type prompt to directly confirm that, the dialog manager 216 may proceed with a search and output text and/or images of a few possibly relevant inventory items to the user. Prompt 1204 may thus announce "I found these sneakers:" and show images of (or, more generally, images characterizing) specific items or item groups available for purchase. This approach makes it easy for a user who provided a less than fully-constrained query to affirm or negate a single suggestion type prompt. The affirmation may be verbal reply or a selection of a particular displayed item, for example.

In another example, the dialog manager 216 may select a prompt that comprises a validating statement, such as "I understand you want to find red nike shoes" or "OK I can help you find red nike shoes now" to conversationally lead the user to provide further confirmatory and revelatory discussion of the dominant object of user interest. This prompt type allows a user to resolve ambiguities that the intelligent personal assistant system 106 may not have been able to resolve automatically without asking question type prompts that may cause confusion. This ambiguity may occur for example if there are many unusual spelling errors in user textual input, or if the user's speech was received in a noisy environment, so that normalizing has not worked well.

The validating statement type prompt may also be of particular utility when a user has provided an utterance that indicates a change in user interest. That is, the bot may make a validating statement to allow the user to confirm that a new search mission has begun, and that the context of a previous search mission is no longer applicable. For example, the bot that was previously looking for red nike shoes may respond to a user input regarding an umbrella with "OK let's look for an umbrella now instead of red nike shoes." If the user did not intend to change interest, there is a good chance the user will provide a more detailed reply summarizing the relevant query terms to put the bot "back on target".

In another example, the dialog manager 216 may generate a prompt that not only indicates that no item meeting all of the specified search constraints has been found in an inventory, but that items meeting some or most of the specified search constraints have been found via a search to be available. For example, if no red nike shoes of the user query are in the inventory, the dialog manager 216 may say "No red nike shoes are currently available, but nike shoes are available now in blue or green." This prompt approach thus avoids the dead-end search outcome that might cause a user to lose interest in searching entirely, and encourages the user to pursue a slightly broadened or modified search that is already determined to be likely to succeed. The dialog manager 216 may thus encourage a user to "backtrack" and continue searching via related item attribute values, item attributes, or even item categories. This prompt generation approach may be of particular utility for someone who is browsing or searching for a gift for a target recipient whose preferences are not well known.

Similarly, if a user is looking for black nike shoes but only red, blue, and green nike shoes are available in the inventory as determined by a search, a prompt that asks the user if the user is interested in black nike shoes may be counterproductive and actually annoying. Therefore, in one embodiment, no prompt of any type is generated by the dialog manager 216 if such a prompt, when affirmed by the user's reply, will lead to items that are not available an inventory. That is, this version of the intelligent online personal assistant 106 does not actively lead the user into a dead end.

Figure 13:
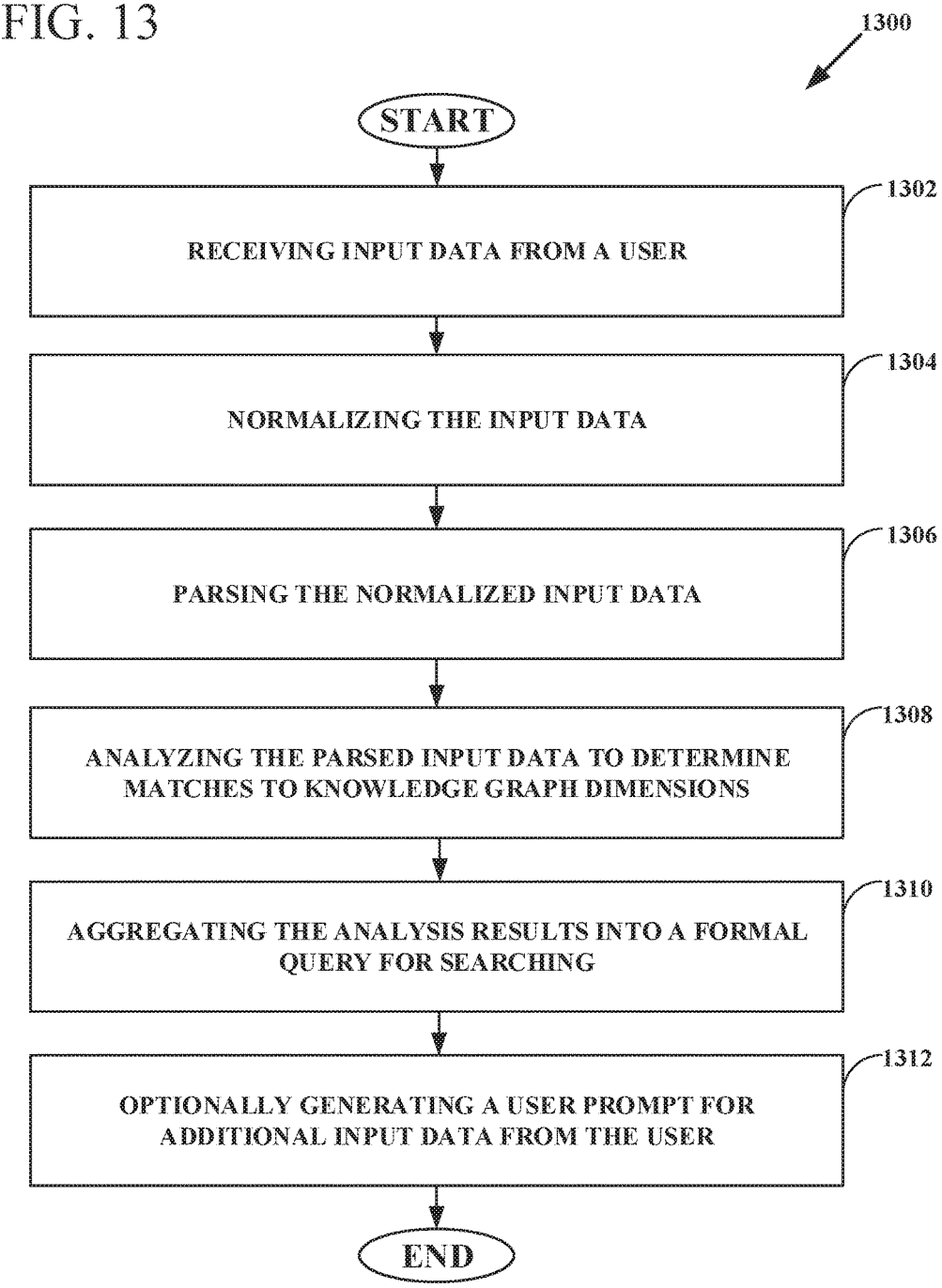
FIG. 13 shows a flowchart of a methodology for processing natural language user inputs to generate an item recommendation, according to some example embodiments.

FIG. 13 shows a flowchart of a methodology for processing natural language user inputs to generate an item recommendation, according to some example embodiments. This methodology may be implemented via the structural elements previously described, as well as via instructions executed by a processor in a computing machine. At 1302, the methodology may receive input data from a user. At 1304, the methodology may normalize the received input data. At 1306, the methodology may parse the normalized input data, to for example identify a dominant object of user interest and related parameters from the parsed input data.

At 1308, the methodology may analyze the parsed input data to find matches between the dimensions of the knowledge graph 808 and the dominant object and the related parameters. At 1310, the methodology may aggregate the analysis results into a formal query for searching. At 1312, the methodology may optionally generate a user prompt or prompts for additional input data from the user.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
receiving a user query comprising a raw audio waveform;
converting the raw audio waveform to a dimensional vector that represents audio associated with the user query by projecting the raw audio waveform into a high dimensional semantic space;
applying a statistical model to the dimensional vector;
applying a statistical grammar model to the dimensional vector model to create query text;
extracting, by one or more processors based on one or more grammatical relationships between words in the query text, query attributes from the user query, the query attributes comprising a dominant object of user interest for the query text and an item attribute for the dominant object of interest;
determining a plurality of association strength values for nodes of a knowledge graph based on the dominant object of interest and the item attribute;
selecting, by the one or more processors, at least two nodes among the nodes of the knowledge graph based on the plurality of association strength values, and based on inventory availability of one or more products corresponding to the at least two nodes, wherein the inventory availability indicates that the one or more products are available for purchase at an online marketplace;
generating and transmitting a question type prompt for display at a user device prompting for selection between a first item category associated with a first node of the at least two nodes and a second item category associated with a second node of the at least two nodes, the question type prompt suggesting various products based on the first item category associated with the first node and the second item category associated with a second node;
receiving, from the user device and in response to the question type prompt, a selection of one of the first item category or the second item category;
generating a suggestion for an item based on the response to the question type prompt; and
transmitting, to the user device, a set of search results associated with the first item category or the second item category based on the received selection and the inventory availability, the set of search results including the item suggestion.

2. The method of claim 1, wherein the knowledge graph is based on inventory related data.

3. The method of claim 1, further comprising:
prioritizing the nodes of the knowledge graph based on a correlation value of a link between a node and one of the nodes of the knowledge graph that is matched with the dominant object of user interest; and
generating and transmitting a sequence of question type prompts based on the prioritizing of the nodes of the knowledge graph.

4. The method of claim 1, wherein the question type prompt provides suggested reply phrasing based on the at least two nodes on which the question type prompt is based.

5. The method of claim 1, further comprising generating a different question prompt that notes nodes of the knowledge graph that do not meet all user search constraints if there are no nodes of the knowledge graph that meet all user search constraints.

6. The method of claim 1, wherein one or more pair of nodes of the knowledge graph are linked via a link, each link being associated with an association strength value, and wherein the at least two nodes are selected based on a predetermined hierarchy of the nodes of the knowledge graph.

7. The method of claim 1, wherein the at least two nodes the question type prompt is based on are selected based on a depth of linked nodes that can be resolved by an affirmation or negation type reply.

8. The method of claim 1, wherein the question type prompt provides suggestions that relevant to a successful search and gathers additional user input.

9. The method of claim 8, wherein the question type prompt is relevant to a successful search due to one of inventory or past user interaction.

10. A non-transitory computer-readable storage medium having embedded therein a set of instructions which, when executed by one or more processors of a computer, causes the computer to execute operations comprising:
receiving a user query comprising a raw audio waveform;
converting the raw audio waveform to a dimensional vector that represents audio associated with the user query by projecting the raw audio waveform into a high dimensional semantic space;
applying a statistical model to the dimensional vector;
applying a statistical grammar model to the dimensional vector model to create query text;
extracting based on one or more grammatical relationships between words in the query text, query attributes from the user query, the query attributes comprising a dominant object of user interest for the query text and an item attribute for the dominant object of interest;

determining a plurality of association strength values for nodes of a knowledge graph based on the dominant object of interest and the item attribute;

selecting at least two nodes among the nodes of the knowledge graph based on the plurality of association strength values, and based on inventory availability of one or more products corresponding to the at least two nodes, wherein the inventory availability indicates that the one or more products are available for purchase at an online marketplace;

generating and transmitting a question type prompt for display at a user device prompting for selection between a first item category associated with a first node of the at least two nodes and a second item category associated with a second node of the at least two nodes, the question type prompt suggesting various products based on the first item category associated with the first node and the second item category associated with a second node;

receiving, from the user device and in response to the question type prompt, a selection of one of the first item category or the second item category;

generating a suggestion for an item based on the response to the question type prompt; and transmitting, to the user device, a set of search results associated with the first item category or the second item category based on the received selection and the inventory availability, the set of search results including the item suggestion.

11. The non-transitory computer-readable storage medium of claim 10, wherein the knowledge graph is based on inventory related data.

12. The non-transitory computer-readable storage medium of claim 10, the operations further comprising:
prioritizing the nodes of the knowledge graph based on a correlation value of a link between a node and one of the nodes of the knowledge graph that is matched with the dominant object of user interest; and
generating and transmitting a sequence of question type prompts based on the prioritizing of the nodes of the knowledge graph.

13. The non-transitory computer-readable storage medium of claim 10, wherein the question type prompt provides suggested reply phrasing based on the at least two nodes on which the question type prompt is based.

14. The non-transitory computer-readable storage medium of claim 10, the operations further comprising generating a different question type prompt that notes nodes of the knowledge graph that do not meet all user search constraints if there are no nodes of the knowledge graph that meet all user search constraints.

15. The non-transitory computer-readable storage medium of claim 10, wherein one or more pair of nodes of the knowledge graph are linked via a link, each link being associated with an association strength value, and wherein the at least two nodes are selected based on a predetermined hierarchy of the nodes of the knowledge graph.

16. The non-transitory computer-readable storage medium of claim 10, wherein the at least two nodes the question type prompt is based on are selected based on at least a depth of linked nodes that can be resolved by an affirmation or negation type reply.

17. A system comprising:
one or more processors; and
a non-transitory memory storing instructions that, when executed, configure the one or more processors to perform operations comprising:
receiving a user query comprising a raw audio waveform;
converting the raw audio waveform to a dimensional vector that represents audio associated with the user query by projecting the raw audio waveform into a high dimensional semantic space;
applying a statistical model to the dimensional vector;
applying a statistical grammar model to the dimensional vector model to create query text;
extracting based on one or more grammatical relationships between words in the query text, query attributes from the user query, the query attributes comprising a dominant object of user interest for the query text and an item attribute for the dominant object of interest;
determining a plurality of association strength values for nodes of a knowledge graph based on the dominant object of interest and the item attribute;
selecting at least two nodes among the nodes of the knowledge graph based on the plurality of association strength values, and based on inventory availability of one or more products corresponding to the at least two nodes, wherein the inventory availability indicates that the one or more products are available for purchase at an online marketplace;
generating and transmitting a question type prompt for display at a user device prompting for selection between a first item category associated with a first node of the at least two nodes and a second item category associated with a second node of the at least two nodes, the question type prompt suggesting various products based on the first item category associated with the first node and the second item category associated with a second node;
receiving, from the user device and in response to the question type prompt, a selection of one of the first item category or the second item category;
generating a suggestion for an item based on the response to the question type prompt; and
transmitting, to the user device, a set of search results associated with the first item category or the second item category based on the received selection and the inventory availability, the set of search results including the item suggestion.

18. The system of claim 17, wherein the knowledge graph is based on inventory related data.

19. The system of claim 17, the operations further comprising:
prioritizing the nodes of the knowledge graph based on a correlation value of a link between a node and one of the nodes of the knowledge graph that is matched with the dominant object of user interest; and
generating and transmitting a sequence of question type prompts based on the prioritizing of the nodes of the knowledge graph.

20. The system of claim 17, wherein the question type prompt provides suggested reply phrasing based on the at least two nodes of the knowledge graph on which the question type prompt is based.

21. The system of claim 17, the operations further comprising generating a different question type prompt that notes nodes of the knowledge graph that do not meet all user search constraints if there are no nodes of the knowledge graph that meet all user search constraints.

22. The system of claim 17, wherein one or more pair of nodes of the knowledge graph are linked via a link, each link being associated with an association strength value, and wherein the at least two nodes are selected based on a predetermined hierarchy of the nodes of the knowledge graph.

* * * * *